US012640806B2

(12) United States Patent
Wang et al.

(10) Patent No.: US 12,640,806 B2
(45) Date of Patent: May 26, 2026

(54) COMMUNICATION METHOD AND COMMUNICATION APPARATUS

(71) Applicant: HUAWEI TECHNOLOGIES CO., LTD., Shenzhen (CN)

(72) Inventors: Yu Wang, Hangzhou (CN); Hejia Luo, Hangzhou (CN); Yunfei Qiao, Hangzhou (CN); Ying Chen, Hangzhou (CN); Xiaolu Wang, Hangzhou (CN); Rong Li, Boulogne Billancourt (FR)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 301 days.

(21) Appl. No.: 18/458,161

(22) Filed: Aug. 30, 2023

(65) Prior Publication Data

US 2023/0403069 A1     Dec. 14, 2023

Related U.S. Application Data

(63) Continuation of application No. PCT/CN2022/078943, filed on Mar. 3, 2022.

(30) Foreign Application Priority Data

Mar. 4, 2021     (CN) ........................ 202110242630.X

(51) Int. Cl.
*H04B 7/185* (2006.01)
*H04W 64/00* (2009.01)
*H04W 72/0446* (2023.01)

(52) U.S. Cl.
CPC ..... *H04B 7/18513* (2013.01); *H04B 7/18519* (2013.01); *H04W 64/00* (2013.01); *H04W 72/0446* (2013.01)

(58) Field of Classification Search
CPC ........... H04B 7/18513; H04B 7/18519; H04W 64/00; H04W 72/0446; G01S 19/00;
(Continued)

(56) References Cited

U.S. PATENT DOCUMENTS

2013/0177030 A1     7/2013  Kim et al.
2016/0065338 A1     3/2016  Kim et al.
(Continued)

FOREIGN PATENT DOCUMENTS

CA          2025969 C     4/1993
CN      103546413 A     1/2014
(Continued)

OTHER PUBLICATIONS

Nader Alagha et al, Beam Hopping in DVB-S2X, DVB Webinar Mar. 30, 2020, 37 pages.
(Continued)

*Primary Examiner* — Sun Jong Kim

(57) ABSTRACT

In a communication method, to meet a requirement of a positioning service, a first communication apparatus obtains data to be processed, and determines a first frame structure that includes a communication time period and a positioning time period. A first switching time period is included between the communication time period and the positioning time period, a $1^{st}$ time-domain symbol occupied by the first switching time period is consecutive to a last time-domain symbol occupied by the communication time period, and a last time-domain symbol occupied by the first switching time is consecutive to a $1^{st}$ time-domain symbol occupied by the positioning time period. The first communication apparatus then processes the data based on the first frame structure.

20 Claims, 12 Drawing Sheets

(58) Field of Classification Search
CPC ..... H04L 27/26; H04L 5/0053; H04L 5/0044;
H04L 5/0048; H04L 5/0091; H04L
5/0078
See application file for complete search history.

(56) References Cited

U.S. PATENT DOCUMENTS

| | | | |
|---|---|---|---|
| 2016/0338081 A1 | 11/2016 | Jiang et al. | |
| 2018/0049222 A1 | 2/2018 | Manolakos et al. | |
| 2020/0068535 A1* | 2/2020 | Wang | H04W 72/1273 |
| 2020/0344103 A1* | 10/2020 | Jung | H04J 11/0073 |

FOREIGN PATENT DOCUMENTS

| | | | |
|---|---|---|---|
| CN | 104079392 A | 10/2014 |
| CN | 106899527 A | 6/2017 |
| CN | 111181710 A | 5/2020 |

OTHER PUBLICATIONS

Tyler G.R. Reid et al, Broadband LEO Constellations for Navigation, First published: Jun. 25, 2018, with the English Abtract, 23 pages.
Yu Wang et al, Integrated Communication and Navigation for Ultra-Dense LEO Satellite Networks: Vision, Challenges and Solutions, arXiv:2105.08985v1 [eess.SP] May 19, 2021, 15 pages.
Stefano Andrenacci et al., Optimized Link Adaptation for DVB-S2X Precoded Waveforms based on SNIR Estimation, 2016 50th Asilomar Conference on Signals, Systems and Computers, Date Added to IEEE Xplore: Mar. 6, 2017, 5 pages.

* cited by examiner

First communication apparatus

401: Obtain first information

402: Determine a first frame structure based on the first information

COMMUNICATION METHOD AND COMMUNICATION APPARATUS

CROSS-REFERENCE TO RELATED APPLICATIONS

This application is a continuation of International Application PCT/CN2022/078943, filed on Mar. 3, 2022, which claims priority to Chinese Patent Application 202110242630.X, filed on Mar. 4, 2021. The disclosures of the aforementioned applications are hereby incorporated by reference in their entirety.

TECHNICAL FIELD

This application relates to the field of communication, and in particular, to a communication method and a communication apparatus.

BACKGROUND

Non-terrestrial networks (NTNs) include satellite networks, high-altitude platforms, unmanned aerial vehicles, and the like. The NTN network has prominent advantages of global coverage, long-distance transmission, flexible networking, convenient deployment, no geographical limitation, and the like. The NTN network has been widely used in many fields such as maritime communication, positioning and navigation, disaster relief, scientific experiment, video broadcasting, and earth observation.

To reduce satellite load, a beam hopping NTN technology is mainly used. For example, in a beam hopping satellite system, a satellite covers a corresponding area by using a corresponding beam at different moments, so that all coverage areas of the satellite are served at a plurality of moments. Based on the beam hopping NTN technology, positioning is performed on the area covered by the satellite. This technology is referred to as a beam hopping-based NTN positioning technology. The beam hopping-based NTN positioning technology generally has the characteristics of dynamic topology structure change, large transmission delay, insignificant near-far effect, and the like. Therefore, to accurately perform positioning on an area covered by a satellite, based on the beam hopping NTN technology, a positioning area is covered by beams of a plurality of different satellites, so as to implement multi-satellite collaborative positioning.

However, the current beam hopping-based NTN positioning technology does not define a corresponding frame structure used by the NTN network to support a requirement of a positioning service.

SUMMARY

Embodiments of this application provide a communication method and a communication apparatus, so that a first communication apparatus performs positioning on a second communication apparatus based on a first frame structure, so as to meet a requirement of a positioning service.

A first aspect of an embodiment of this application provides a communication method, and the communication method includes:

A first communication apparatus obtains data; then the first communication apparatus determines a first frame structure; and the first communication apparatus processes the data based on the first frame structure. The first frame structure includes at least one communication time period and at least one positioning time period, the communication time period occupies one or more time-domain symbols in the first frame structure, and the positioning time period occupies one or more time-domain symbols in the first frame structure. The communication time period is used to transmit the data, and the positioning time period is used to transmit a positioning reference signal of the first communication apparatus. A first switching time period is included between the communication time period and the positioning time period, a $1^{st}$ time-domain symbol occupied by the first switching time period is consecutive to a last time-domain symbol occupied by the communication time period, and a last time-domain symbol occupied by the first switching time is consecutive to a $1^{st}$ time-domain symbol occupied by the positioning time period; or a second switching time period is included between the positioning time period and the communication time period, a $1^{st}$ time-domain symbol occupied by the second switching time period is consecutive to a last time-domain symbol occupied by the positioning time period, and a last time-domain symbol occupied by the second switching time period is consecutive to a $1^{st}$ time-domain symbol occupied by the communication time period.

In this embodiment, the first frame structure includes the communication time period used for data transmission and the positioning time period used for positioning. In this way, based on the first frame structure, a second communication apparatus may perform positioning on the first communication apparatus, to support a positioning requirement of a beam hopping-based NTN network or a terrestrial communication network. In addition, the first switching time period is included between the communication time period and the positioning time period, or the second switching time period is included between the positioning time period and the communication time period. In this way, positioning performance can be improved, and reliability of a communication service and a positioning service can be ensured.

In a possible implementation, the communication time period is a communication subframe, and the positioning time period is a positioning subframe. The first switching time period is located in the communication subframe or the positioning subframe, and the second switching time period is located in the communication subframe or the positioning subframe.

In the possible implementation, a specific length example of the communication time period and the positioning time period is provided. In addition, a configuration manner of configuring the communication time period and the positioning time period in the first frame structure by using a subframe as a length is simpler and more convenient. The second communication apparatus does not need to further indicate a length of each communication time period and a length of each positioning time period in the first frame structure, thereby reducing overheads of corresponding indication signaling. The first switching time period and the second switching time period may be located in the communication subframe or the positioning subframe. In actual application, the first switching time period and the second switching time period may be placed with reference to a communication service volume of the first communication apparatus. For example, when the communication service volume of the first communication apparatus is large, the first switching time period and the second switching time period may be located in the positioning subframe. When the communication service volume of the first communication apparatus is small, the first switching time period and the second switching time period may be located in the communication subframe. A location of a switching time period in the first frame structure is flexibly designed, and flexibility and practicability of the solution are improved.

In another possible implementation, the communication time period is a communication slot, and the positioning time period is a positioning slot. The first switching time period is located in the communication slot or the positioning slot, and the second switching time period is located in the communication slot or the positioning slot.

In this possible implementation, another specific length example of the communication time period and the positioning time period is provided, thereby improving diversity of the solution. In addition, a configuration manner of configuring the communication time period and the positioning time period in the first frame structure by using a slot as a length is simpler and more convenient. The second communication apparatus does not need to further indicate a length of each communication time period and a length of each positioning time period in the first frame structure, thereby reducing overheads of corresponding indication signaling. The first switching time period and the second switching time period may be located in the communication subframe or the positioning subframe. In actual application, the first switching time period and the second switching time period may be placed with reference to a communication service volume of the first communication apparatus. For example, when the communication service volume of the first communication apparatus is large, the first switching time period and the second switching time period may be located in the positioning slot. When the communication service volume of the first communication apparatus is small, the first switching time period and the second switching time period may be located in the communication slot. A location of a switching time period in the first frame structure is flexibly designed, and flexibility and practicability of the solution are improved.

In another possible implementation, if a subcarrier spacing used in the first frame structure is 15 kilohertz kHz, the first switching time period occupies one time-domain symbol in the first frame structure, and the second switching time period occupies one time-domain symbol in the first frame structure; and if a subcarrier spacing used in the first frame structure is 30 kilohertz kHz, the first switching time period occupies two time-domain symbols in the first frame structure, and the second switching time period occupies two time-domain symbols in the first frame structure; or if a subcarrier spacing used in the first frame structure is 15 kilohertz kHz, the first switching time period occupies two time-domain symbols in the first frame structure, and the second switching time period occupies two time-domain symbols in the first frame structure; and if a subcarrier spacing used in the first frame structure is 30 kilohertz kHz, the first switching time period occupies four time-domain symbols in the first frame structure, and the second switching time period occupies four time-domain symbols in the first frame structure.

In the foregoing two possible implementations, in both the first switching time period and the second switching time period, a communication apparatus can generally complete a related switching operation. For example, in the first switching time period, an auxiliary satellite directs a beam to an area range in which a terminal device is located. In the second switching time period, the auxiliary satellite redirects the beam to beam coverage of the auxiliary satellite. In this way, the auxiliary satellite assists positioning of the terminal device, thereby improving positioning performance and ensuring reliability of a communication service and a positioning service. In addition, in the foregoing two possible implementations, interruption time of the communication service and the positioning service can be minimized, thereby minimizing system overheads.

In another possible implementation, that the first communication apparatus determines the first frame structure includes: The first communication apparatus obtains first information, where the first information indicates the first frame structure; and the first communication apparatus determines the first frame structure based on the first information.

This implementation provides a specific manner in which the first communication apparatus determines the first frame structure. The first communication apparatus determines the first frame structure by using the received first information.

In another possible implementation, the first frame structure includes M flexible time periods, where an $m^{th}$ flexible time period in the M flexible time periods is the communication time period or the positioning time period, m is an integer greater than or equal to 1 and less than or equal to M, and M is a positive integer.

In the possible implementation, the first frame structure includes the M flexible time periods. A flexible time period may be configured as the communication time period or the positioning time period. Therefore, a purpose of the flexible time period specifically depends on configuration of the flexible time period by the second communication apparatus. Therefore, the first frame structure in this application supports flexible configuration of the communication time period and the positioning time period. The first frame structure designed based on this implementation is more flexible and more practical.

In another possible implementation, the method further includes: The first communication apparatus receives second information, where the second information indicates the M flexible time periods.

In the foregoing implementation, the first communication apparatus may determine which time periods in the first frame structure are flexible time periods, so that the second communication apparatus subsequently configures types of the M flexible time periods.

In another possible implementation, the first communication apparatus obtains the first information includes: The first communication apparatus receives a first message, where the first message includes the first information.

In the foregoing implementation, the first message carries the first information, so as to indicate the first information to the first communication apparatus.

In another possible implementation, the first message further includes third information, and the third information indicates a length of a switching time period in the first frame structure.

In the foregoing implementation, the third information indicates the length of the switching time period in the first frame structure, that is, a specific indication manner is provided. That is, the first frame structure and the length of the switching time period are respectively indicated by using different information. In addition, the third information is carried by using a newly added information element, so as to indicate the length of the switching time period.

In another possible implementation, the first information further indicates a length of a switching time period in the first frame structure.

In the implementation, the first frame structure and the length of the switching time period are indicated by same information, thereby reducing indication overheads.

In another possible implementation, the first message includes any one of the following: a system information block (SIB) message, a radio resource control (RRC) message, a media access control control element (MAC CE), an Xn interface application protocol (XnAP) message, or downlink control information (DCI).

In this possible implementation, a plurality of message types that carry the first information are provided, to provide a basis for implementing the solution.

In another possible implementation, the first information indicates a frame structure used by a second communication apparatus in a first cell; or the first information indicates a frame structure used by a second communication apparatus on each of a plurality of beams corresponding to a first cell. The first cell is a cell in which the first communication apparatus is located, and the first cell is a cell managed by the second communication apparatus.

In this implementation, a plurality of possible frame structure configuration granularities are provided. The second communication apparatus configures a frame structure for the first communication apparatus in a cell-level manner. In this way, a configuration process of the frame structure is simple and convenient. The second communication apparatus configures the frame structure for the first communication apparatus in a beam-level manner. In this way, a more appropriate frame structure may be configured for each beam with reference to a service feature of each beam.

In another possible implementation, the method further includes: The first communication apparatus receives an updated frame structure used by the second communication apparatus on each of the plurality of beams in the first cell.

In this implementation, the second communication apparatus periodically updates the frame structure used by the second communication apparatus on each beam. In this way, a more adaptive frame structure can be properly updated with reference to a requirement of each beam. Therefore, reliability of a communication service and a positioning service is ensured, communication interruption time is reduced, and system performance is improved.

A second aspect of an embodiment of this application provides a communication method, and the communication method includes:

A second communication apparatus determines a first frame structure, where the first frame structure includes at least one communication time period and at least one positioning time period, the communication time period occupies one or more time-domain symbols in the first frame structure, and the positioning time period occupies one or more time-domain symbols in the first frame structure; and the second communication apparatus transmits data in the communication time period, and transmits a positioning reference signal of a first communication apparatus in the positioning time period. A first switching time period is included between the communication time period and the positioning time period, a $1^{st}$ time-domain symbol occupied by the first switching time period is consecutive to a last time-domain symbol occupied by the communication time period, and a last time-domain symbol occupied by the first switching time is consecutive to a $1^{st}$ time-domain symbol occupied by the positioning time period; or a second switching time period is included between the positioning time period and the communication time period, a $1^{st}$ time-domain symbol occupied by the second switching time period is consecutive to a last time-domain symbol occupied by the positioning time period, and a last time-domain symbol occupied by the second switching time period is consecutive to a $1^{st}$ time-domain symbol occupied by the communication time period.

In this embodiment, the first frame structure includes the communication time period used for data transmission and the positioning time period used for positioning. In this way, based on the first frame structure, the second communication apparatus may perform positioning on the first communication apparatus, to support a positioning requirement of a beam hopping-based NTN network or a terrestrial communication network. In addition, the first switching time period is included between the communication time period and the positioning time period, or the second switching time period is included between the positioning time period and the communication time period. In this way, positioning performance can be improved, and reliability of a communication service and a positioning service can be ensured.

In a possible implementation, the communication time period is a communication subframe, and the positioning time period is a positioning subframe. The first switching time period is located in the communication subframe or the positioning subframe, and the second switching time period is located in the communication subframe or the positioning subframe.

In the possible implementation, a specific length example of the communication time period and the positioning time period is provided. In addition, a configuration manner of configuring the communication time period and the positioning time period in the first frame structure by using a subframe as a length is simpler and more convenient. The second communication apparatus does not need to further indicate a length of each communication time period and a length of each positioning time period in the first frame structure, thereby reducing overheads of corresponding indication signaling. The first switching time period and the second switching time period may be located in the communication subframe or the positioning subframe. In actual application, the first switching time period and the second switching time period may be placed with reference to a communication service volume of the first communication apparatus. For example, when the communication service volume of the first communication apparatus is large, the first switching time period and the second switching time period may be located in the positioning subframe. When the communication service volume of the first communication apparatus is small, the first switching time period and the second switching time period may be located in the communication subframe. A location of a switching time period in the first frame structure is flexibly designed, and flexibility and practicability of the solution are improved.

In another possible implementation, the communication time period is a communication slot, and the positioning time period is a positioning slot. The first switching time period is located in the communication slot or the positioning slot, and the second switching time period is located in the communication slot or the positioning slot.

In this possible implementation, another specific length example of the communication time period and the positioning time period is provided, thereby improving diversity of the solution. In addition, a configuration manner of configuring the communication time period and the positioning time period in the first frame structure by using a slot as a length is simpler and more convenient. The second communication apparatus does not need to further indicate a length of each communication time period and a length of each positioning time period in the first frame structure, thereby reducing overheads of corresponding indication signaling. The first switching time period and the second switching time period may be located in the communication subframe or the positioning subframe. In actual application, the first switching time period and the second switching time period may be placed with reference to a communication service volume of the first communication apparatus. For example, when the communication service volume of the first communication apparatus is large, the first switching time period and the second switching time period may be located in the positioning slot. When the communication service volume of the first communication apparatus is small, the first switching time period and the second switching time period may be located in the communication slot. A location of a switching time period in the first frame structure is flexibly designed, and flexibility and practicability of the solution are improved.

In another possible implementation, if a subcarrier spacing used in the first frame structure is 15 kilohertz kHz, the first switching time period occupies one time-domain symbol in the first frame structure, and the second switching time period occupies one time-domain symbol in the first frame structure; and if a subcarrier spacing used in the first frame structure is 30 kilohertz kHz, the first switching time period occupies two time-domain symbols in the first frame structure, and the second switching time period occupies two time-domain symbols in the first frame structure; or if a subcarrier spacing used in the first frame structure is 15 kilohertz kHz, the first switching time period occupies two time-domain symbols in the first frame structure, and the second switching time period occupies two time-domain symbols in the first frame structure; and if a subcarrier spacing used in the first frame structure is 30 kilohertz kHz, the first switching time period occupies four time-domain symbols in the first frame structure, and the second switching time period occupies four time-domain symbols in the first frame structure.

In the foregoing two possible implementations, in both the first switching time period and the second switching time period, a communication apparatus can generally complete a related switching operation. For example, in the first switching time period, an auxiliary satellite directs a beam to an area range in which a terminal device is located. In the second switching time period, the auxiliary satellite redirects the beam to beam coverage of the auxiliary satellite. In this way, the auxiliary satellite assists positioning of the terminal device, thereby improving positioning performance and ensuring reliability of a communication service and a positioning service. In addition, in the foregoing two possible implementations, interruption time of the communication service and the positioning service can be minimized, thereby minimizing system overheads.

In another possible implementation, the method further includes: The second communication apparatus sends first information, where the first information indicates the first frame structure.

In this implementation, the second communication apparatus sends the first information to the first communication apparatus, so that the first communication apparatus determines the first frame structure.

In another possible implementation, the first frame structure includes M flexible time periods, where an m^{th} flexible time period in the M flexible time periods is the communication time period or the positioning time period, m is an integer greater than or equal to 1 and less than or equal to M, and M is a positive integer.

In the possible implementation, the first frame structure includes the M flexible time periods. A flexible time period may be configured as the communication time period or the positioning time period. Therefore, a purpose of the flexible time period specifically depends on configuration of the flexible time period by the second communication apparatus. Therefore, the first frame structure in this application supports flexible configuration of the communication time period and the positioning time period. The first frame structure designed based on this implementation is more flexible and more practical.

In another possible implementation, the method further includes: The second communication apparatus sends second information, where the second information indicates the M flexible time periods.

In the foregoing implementation, the second communication apparatus sends the second information to the first communication apparatus, so that the first communication apparatus determines which time periods in the first frame structure are flexible time periods, and the second communication apparatus subsequently configures types of the M flexible time periods.

In another possible implementation, the step of the second communication apparatus sending the first information includes: The second communication apparatus sends a first message, where the first message includes the first information.

In the foregoing implementation, the first message carries the first information, so as to indicate the first information to the first communication apparatus.

In another possible implementation, the first message further includes third information, and the third information indicates a length of a switching time period in the first frame structure.

In the foregoing implementation, the third information indicates the length of the switching time period in the first frame structure, that is, a specific indication manner is provided. That is, the first frame structure and the length of the switching time period are respectively indicated by using different information. In addition, the third information is carried by using a newly added information element, so as to indicate the length of the switching time period.

In another possible implementation, the first information further indicates a length of a switching time period in the first frame structure.

In the implementation, the first frame structure and the length of the switching time period are indicated by same information, thereby reducing indication overheads.

In another possible implementation, the first message includes any one of the following: a SIB message, an RRC message, a MAC CE, an XnAP message, or DCI.

In this possible implementation, a plurality of message types that carry the first information are provided, to provide a basis for implementing the solution.

In another possible implementation, the first information indicates a frame structure used by a second communication apparatus in a first cell; or the first information indicates a frame structure used by a second communication apparatus on each of a plurality of beams corresponding to a first cell. The first cell is a cell in which the first communication apparatus is located, and the first cell is a cell managed by the second communication apparatus.

In this implementation, a plurality of possible frame structure configuration granularities are provided. The second communication apparatus configures a frame structure for the first communication apparatus in a cell-level manner. In this way, a configuration process of the frame structure is simple and convenient. The second communication apparatus configures the frame structure for the first communication apparatus in a beam-level manner. In this way, a more appropriate frame structure may be configured for each beam with reference to a service feature of each beam.

In another possible implementation, the method further includes: The second communication apparatus determines, based on a communication service volume, a frame structure used by the second communication apparatus on each beam, where the communication service volume includes communication service volumes respectively corresponding to the plurality of beams.

In the foregoing implementation, a non-uniformity characteristic of a communication service carried on a beam in an NTN network is fully considered, and the second communication apparatus configures a more adaptive frame structure for each beam based on a communication service volume of each beam. In addition to improving positioning performance, reliability of a communication service is ensured.

In another possible implementation, the method further includes: The second communication apparatus updates, based on update periodicities respectively corresponding to the plurality of beams in the first cell, the frame structure used by the second communication apparatus on each of the plurality of beams in the first cell; and then the second communication apparatus sends the updated frame structure used by the second communication apparatus on each beam.

In this implementation, the second communication apparatus periodically updates the frame structure used by the second communication apparatus on each beam. In this way, a more adaptive frame structure can be properly updated with reference to a requirement of each beam. Therefore, reliability of a communication service and a positioning service is ensured, communication interruption time is reduced, and system performance is improved.

A third aspect of an embodiment of this application provides a first communication apparatus, where the first communication apparatus includes:

a transceiver module, configured to obtain data; and a processing module, configured to determine a first frame structure; and process the data based on the first frame structure. The first frame structure includes at least one communication time period and at least one positioning time period, the communication time period occupies one or more time-domain symbols in the first frame structure, and the positioning time period occupies one or more time-domain symbols in the first frame structure.

The communication time period is used to transmit the data, and the positioning time period is used to transmit a positioning reference signal of the first communication apparatus.

A first switching time period is included between the communication time period and the positioning time period, a $1^{st}$ time-domain symbol occupied by the first switching time period is consecutive to a last time-domain symbol occupied by the communication time period, and a last time-domain symbol occupied by the first switching time is consecutive to a $1^{st}$ time-domain symbol occupied by the positioning time period; or a second switching time period is included between the positioning time period and the communication time period, a $1^{st}$ time-domain symbol occupied by the second switching time period is consecutive to a last time-domain symbol occupied by the positioning time period, and a last time-domain symbol occupied by the second switching time period is consecutive to a $1^{st}$ time-domain symbol occupied by the communication time period.

In a possible implementation, the communication time period is a communication subframe, and the positioning time period is a positioning subframe. The first switching time period is located in the communication subframe or the positioning subframe, and the second switching time period is located in the communication subframe or the positioning subframe.

In another possible implementation, the communication time period is a communication slot, and the positioning time period is a positioning slot. The first switching time period is located in the communication slot or the positioning slot, and the second switching time period is located in the communication slot or the positioning slot.

In another possible implementation, if a subcarrier spacing used in the first frame structure is 15 kilohertz kHz, the first switching time period occupies one time-domain symbol in the first frame structure, and the second switching time period occupies one time-domain symbol in the first frame structure; and if a subcarrier spacing used in the first frame structure is 30 kilohertz kHz, the first switching time period occupies two time-domain symbols in the first frame structure, and the second switching time period occupies two time-domain symbols in the first frame structure; or if a subcarrier spacing used in the first frame structure is 15 kilohertz kHz, the first switching time period occupies two time-domain symbols in the first frame structure, and the second switching time period occupies two time-domain symbols in the first frame structure; and if a subcarrier spacing used in the first frame structure is 30 kilohertz kHz, the first switching time period occupies four time-domain symbols in the first frame structure, and the second switching time period occupies four time-domain symbols in the first frame structure.

In another possible implementation, the processing module is specifically configured to:

obtain first information, where the first information indicates the first frame structure; and determine the first frame structure based on the first information.

In another possible implementation, the first frame structure includes M flexible time periods, where an $m^{th}$ flexible time period in the M flexible time periods is the communication time period or the positioning time period, m is an integer greater than or equal to 1 and less than or equal to M, and M is a positive integer.

In another possible implementation, the transceiver module is further configured to:

receive second information, where the second information indicates the M flexible time periods.

In another possible implementation, the processing module is specifically configured to:

receive a first message, where the first message includes first information.

In another possible implementation, the first message further includes third information, and the third information indicates a length of a switching time period in the first frame structure.

In another possible implementation, the first information further indicates a length of a switching time period in the first frame structure.

In another possible implementation, the first message includes any one of the following: a SIB message, an RRC message, a MAC CE, an XnAP message, or DCI.

In another possible implementation, the first information indicates a frame structure used by a second communication apparatus in a first cell; or the first information indicates a frame structure used by a second communication apparatus on each of a plurality of beams corresponding to a first cell. The first cell is a cell in which the first communication apparatus is located, and the first cell is a cell managed by the second communication apparatus.

In another possible implementation, the processing module is further configured to: update, based on update periodicities corresponding to the plurality of beams in the first cell, the frame structure used by the second communication apparatus on each of the plurality of beams; and the transceiver module is further configured to:

send the updated frame structure used by the second communication apparatus on each beam.

A fourth aspect of an embodiment of this application provides a second communication apparatus, where the second communication apparatus includes:

a processing module, configured to determine a first frame structure, where the first frame structure includes at least one communication time period and at least one positioning time period, the communication time period occupies one or more time-domain symbols in the first frame structure, and the positioning time period occupies one or more time-domain symbols in the first frame structure; and a transceiver module, configured to transmit data in the communication time period, and transmit a positioning reference signal of a first communication apparatus in the positioning time period.

A first switching time period is included between the communication time period and the positioning time period, a $1^{st}$ time-domain symbol occupied by the first switching time period is consecutive to a last time-domain symbol occupied by the communication time period, and a last time-domain symbol occupied by the first switching time is consecutive to a $1^{st}$ time-domain symbol occupied by the positioning time period; or a second switching time period is included between the positioning time period and the communication time period, a $1^{st}$ time-domain symbol occupied by the second switching time period is consecutive to a last time-domain symbol occupied by the positioning time period, and a last time-domain symbol occupied by the second switching time period is consecutive to a $1^{st}$ time-domain symbol occupied by the communication time period.

In a possible implementation, the communication time period is a communication subframe, and the positioning time period is a positioning subframe. The first switching time period is located in the communication subframe or the positioning subframe, and the second switching time period is located in the communication subframe or the positioning subframe.

In another possible implementation, the communication time period is a communication slot, and the positioning time period is a positioning slot. The first switching time period is located in the communication slot or the positioning slot, and the second switching time period is located in the communication slot or the positioning slot.

In another possible implementation, if a subcarrier spacing used in the first frame structure is 15 kilohertz kHz, the first switching time period occupies one time-domain symbol in the first frame structure, and the second switching time period respectively occupies one time-domain symbol in the first frame structure; and if a subcarrier spacing used in the first frame structure is 30 kilohertz kHz, the first switching time period occupies two time-domain symbols in the first frame structure, and the second switching time period occupies two time-domain symbols in the first frame structure; or if a subcarrier spacing used in the first frame structure is 15 kilohertz kHz, the first switching time period occupies two time-domain symbols in the first frame structure, and the second switching time period occupies two time-domain symbols in the first frame structure; and if a subcarrier spacing used in the first frame structure is 30 kilohertz kHz, the first switching time period occupies four time-domain symbols in the first frame structure, and the second switching time period occupies four time-domain symbols in the first frame structure.

In another possible implementation, the transceiver module is further configured to: send first information, where the first information indicates the first frame structure.

In another possible implementation, the first frame structure includes M flexible time periods, where an $m^{th}$ flexible time period in the M flexible time periods is the communication time period or the positioning time period, m is an integer greater than or equal to 1 and less than or equal to M, and M is a positive integer.

In another possible implementation, the transceiver module is further configured to: send second information, where the second information indicates the M flexible time periods.

In another possible implementation, the transceiver module is specifically configured to: send a first message, where the first message includes the first information.

In another possible implementation, the first message further includes third information, and the third information indicates a length of a switching time period in the first frame structure.

In another possible implementation, the first information further indicates a length of a switching time period in the first frame structure.

In another possible implementation, the first message includes any one of the following: a SIB message, an RRC message, a MAC CE, an XnAP message, or DCI.

In another possible implementation, the first information indicates a frame structure used by the second communication apparatus in a first cell; or the first information indicates a frame structure used by the second communication apparatus on each of a plurality of beams corresponding to a first cell. The first cell is a cell in which the first communication apparatus is located, and the first cell is a cell managed by the second communication apparatus.

In another possible implementation, the processing module is further configured to: determine, based on a communication service volume, a frame structure used by the second communication apparatus on each beam, where the communication service volume includes communication service volumes respectively corresponding to the plurality of beams.

In another possible implementation, the processing module is further configured to: update, based on update periodicities respectively corresponding to the plurality of beams in the first cell, the frame structure used by the second communication apparatus on each of the plurality of beams in the first cell; and the transceiver module is further configured to: send the updated frame structure used by the second communication apparatus on each beam.

A fifth aspect of an embodiment of this application provides a first communication apparatus, where the first communication apparatus includes: a processor and a memory. The memory stores a computer program. The processor is configured to invoke and run the computer program stored in the memory, to enable the processor to implement any implementation of the first aspect.

Optionally, the first communication apparatus further includes a transceiver. The processor is further configured to control the transceiver to send and receive a signal.

A sixth aspect of an embodiment of this application provides a second communication apparatus, where the second communication apparatus includes: a processor and a memory. The memory stores a computer program. The processor is configured to invoke and run the computer program stored in the memory, to enable the processor to implement any implementation of the second aspect.

Optionally, the second communication apparatus further includes a transceiver. The processor is further configured to control the transceiver to send and receive a signal.

A seventh aspect of an embodiment of this application provides a first communication apparatus, where the first communication apparatus includes a logic circuit and an input/output interface. The input/output interface is configured to obtain data. The logic circuit is configured to determine a first frame structure; and process the data based on the first frame structure.

The first frame structure includes at least one communication time period and at least one positioning time period, the communication time period occupies one or more time-domain symbols in the first frame structure, and the positioning time period occupies one or more time-domain symbols in the first frame structure. The communication time period is used to transmit the data, and the positioning time period is used to transmit a positioning reference signal of the first communication apparatus. A first switching time period is included between the communication time period and the positioning time period, a $1^{st}$ time-domain symbol occupied by the first switching time period is consecutive to a last time-domain symbol occupied by the communication time period, and a last time-domain symbol occupied by the first switching time is consecutive to a $1^{st}$ time-domain symbol occupied by the positioning time period; or a second switching time period is included between the positioning time period and the communication time period, a $1^{st}$ time-domain symbol occupied by the second switching time period is consecutive to a last time-domain symbol occupied by the positioning time period, and a last time-domain symbol occupied by the second switching time period is consecutive to a $1^{st}$ time-domain symbol occupied by the communication time period.

In a possible implementation, the communication time period is a communication subframe, and the positioning time period is a positioning subframe. The first switching time period is located in the communication subframe or the positioning subframe, and the second switching time period is located in the communication subframe or the positioning subframe.

In another possible implementation, the communication time period is a communication slot, and the positioning time period is a positioning slot. The first switching time period is located in the communication slot or the positioning slot, and the second switching time period is located in the communication slot or the positioning slot.

In another possible implementation, if a subcarrier spacing used in the first frame structure is 15 kilohertz kHz, the first switching time period occupies one time-domain symbol in the first frame structure, and the second switching time period occupies one time-domain symbol in the first frame structure; and if a subcarrier spacing used in the first frame structure is 30 kilohertz kHz, the first switching time period occupies two time-domain symbols in the first frame structure, and the second switching time period occupies two time-domain symbols in the first frame structure; or if a subcarrier spacing used in the first frame structure is 15 kilohertz kHz, the first switching time period occupies two time-domain symbols in the first frame structure, and the second switching time period occupies two time-domain symbols in the first frame structure; and if a subcarrier spacing used in the first frame structure is 30 kilohertz kHz, the first switching time period occupies four time-domain symbols in the first frame structure, and the second switching time period occupies four time-domain symbols in the first frame structure.

In another possible implementation, the logic circuit is specifically configured to:

obtain first information, where the first information indicates the first frame structure; and determine the first frame structure based on the first information.

In another possible implementation, the first frame structure includes M flexible time periods, where an $m^{th}$ flexible time period in the M flexible time periods is the communication time period or the positioning time period, m is an integer greater than or equal to 1 and less than or equal to M, and M is a positive integer.

In another possible implementation, the input/output interface is further configured to:

receive second information, where the second information indicates the M flexible time periods.

In another possible implementation, the logic circuit is specifically configured to:

receive a first message, where the first message includes first information.

In another possible implementation, the first message further includes third information, and the third information indicates a length of a switching time period in the first frame structure.

In another possible implementation, the first information further indicates a length of a switching time period in the first frame structure.

In another possible implementation, the first message includes any one of the following: a SIB message, an RRC message, a MAC CE, an XnAP message, or DCI.

In another possible implementation, the first information indicates a frame structure used by a second communication apparatus in a first cell; or the first information indicates a frame structure used by a second communication apparatus on each of a plurality of beams corresponding to a first cell. The first cell is a cell in which the first communication apparatus is located, and the first cell is a cell managed by the second communication apparatus.

In another possible implementation, the input/output interface is further configured to:

receive an updated frame structure used by the second communication apparatus on each of the plurality of beams in the first cell.

An eighth aspect of an embodiment of this application provides a second communication apparatus, where the second communication apparatus includes a logic circuit and an input/output interface.

The logic circuit is configured to determine a first frame structure, where the first frame structure includes at least one communication time period and at least one positioning time period, the communication time period occupies one or more time-domain symbols in the first frame structure, and the positioning time period occupies one or more time-domain symbols in the first frame structure.

The input/output interface is configured to transmit data in the communication time period, and transmit a positioning reference signal of a first communication apparatus in the positioning time period.

A first switching time period is included between the communication time period and the positioning time period, a $1^{st}$ time-domain symbol occupied by the first switching time period is consecutive to a last time-domain symbol occupied by the communication time period, and a last time-domain symbol occupied by the first switching time is consecutive to a $1^{st}$ time-domain symbol occupied by the positioning time period; or a second switching time period is included between the positioning time period and the communication time period, a $1^{st}$ time-domain symbol occupied by the second switching time period is consecutive to a last time-domain symbol occupied by the positioning time period, and a last time-domain symbol occupied by the second switching time period is consecutive to a $1^{st}$ time-domain symbol occupied by the communication time period.

In a possible implementation, the communication time period is a communication subframe, and the positioning time period is a positioning subframe. The first switching time period is located in the communication subframe or the positioning subframe, and the second switching time period is located in the communication subframe or the positioning subframe.

In another possible implementation, the communication time period is a communication slot, and the positioning time period is a positioning slot. The first switching time period is located in the communication slot or the positioning slot, and the second switching time period is located in the communication slot or the positioning slot.

In another possible implementation, if a subcarrier spacing used in the first frame structure is 15 kilohertz kHz, the first switching time period occupies one time-domain symbol in the first frame structure, and the second switching time period respectively occupies one time-domain symbol in the first frame structure; and if a subcarrier spacing used in the first frame structure is 30 kilohertz kHz, the first switching time period occupies two time-domain symbols in the first frame structure, and the second switching time period occupies two time-domain symbols in the first frame structure; or if a subcarrier spacing used in the first frame structure is 15 kilohertz kHz, the first switching time period occupies two time-domain symbols in the first frame structure, and the second switching time period occupies two time-domain symbols in the first frame structure; and if a subcarrier spacing used in the first frame structure is 30 kilohertz kHz, the first switching time period occupies four time-domain symbols in the first frame structure, and the second switching time period occupies four time-domain symbols in the first frame structure.

In another possible implementation, the input/output interface is further configured to: send first information, where the first information indicates the first frame structure.

In another possible implementation, the first frame structure includes M flexible time periods, where an $m^{th}$ flexible time period in the M flexible time periods is the communication time period or the positioning time period, m is an integer greater than or equal to 1 and less than or equal to M, and M is a positive integer.

In another possible implementation, the input/output interface is further configured to: send second information, where the second information indicates the M flexible time periods.

In another possible implementation, the input/output interface is specifically configured to: send a first message, where the first message includes the first information.

In another possible implementation, the first message further includes third information, and the third information indicates a length of a switching time period in the first frame structure.

In another possible implementation, the first information further indicates a length of a switching time period in the first frame structure.

In another possible implementation, the first message includes any one of the following: a SIB message, an RRC message, a MAC CE, an XnAP message, or DCI.

In another possible implementation, the first information indicates a frame structure used by the second communication apparatus in a first cell; or the first information indicates a frame structure used by the second communication apparatus on each of a plurality of beams corresponding to a first cell. The first cell is a cell in which the first communication apparatus is located, and the first cell is a cell managed by the second communication apparatus.

In another possible implementation, the logic circuit is further configured to: determine, based on a communication service volume, a frame structure used by the second communication apparatus on each beam, where the communication service volume includes communication service volumes respectively corresponding to the plurality of beams.

In another possible implementation, the logic circuit is further configured to: update, based on update periodicities respectively corresponding to the plurality of beams in the first cell, the frame structure used by the second communication apparatus on each of the plurality of beams in the first cell.

The input/output interface is further configured to:
send the updated frame structure used by the second communication apparatus on each beam.

A ninth aspect of an embodiment of this application provides a computer program product including instructions. When the computer program product runs on a computer, the computer is enabled to perform any implementation of the first aspect and the second aspect.

A tenth aspect of an embodiment of this application provides a computer-readable storage medium, including computer instructions. When the computer instructions run on a computer, the computer is enabled to perform any implementation of the first aspect and the second aspect.

An eleventh aspect of an embodiment of this application provides a chip apparatus, including a processor, configured to connect to a memory, and invoke a program stored in the memory, to enable the processor to perform any implementation of the first aspect and the second aspect.

A twelfth aspect of an embodiment of this application provides a communication system. The communication system includes the first communication apparatus in the third aspect and the second communication apparatus in the fourth aspect.

It can be learned from the foregoing technical solutions that embodiments of this application have the following advantages:

It can be learned from the foregoing solutions that the first frame structure includes the communication time period used for data transmission and the positioning time period used for positioning. In addition, the first switching time period is included between the communication time period and the positioning time period, or the second switching time period is included between the positioning time period and the communication time period. In this way, the first communication apparatus performs positioning on the second communication apparatus based on the first frame structure, thereby meeting a requirement of a positioning service.

DESCRIPTION OF EMBODIMENTS

Figure 1:
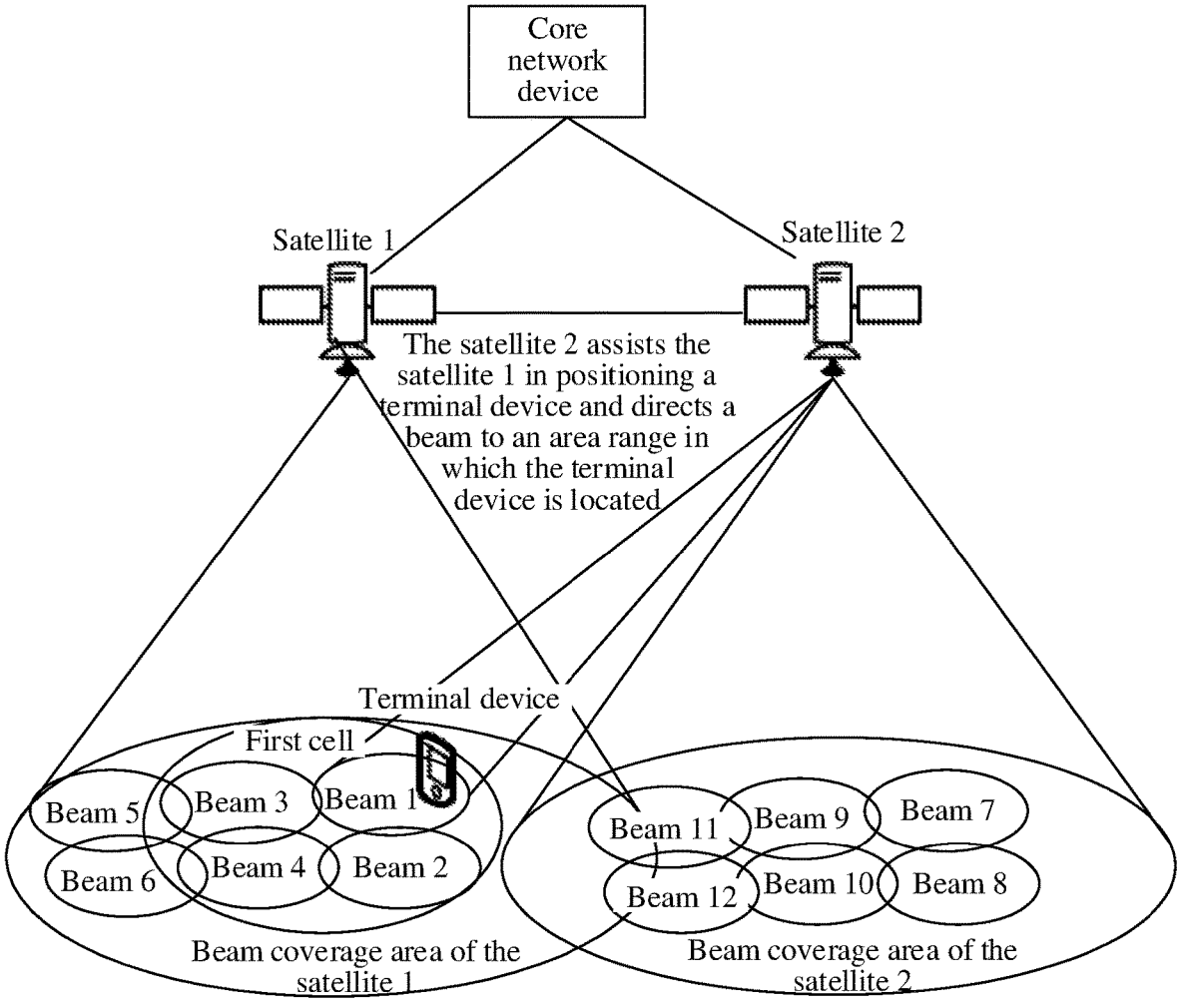
FIG. 1 is a schematic diagram of a communication system according to an embodiment of this application.

Embodiments of this application provide a communication method and a communication apparatus, so that a first communication apparatus performs positioning on a second communication apparatus based on a first frame structure, so as to meet a requirement of a positioning service.

The following clearly and completely describes technical solutions in embodiments of this application with reference to the accompanying drawings in embodiments of this application. Apparently, the described embodiments are merely some but not all of embodiments of this application. All other embodiments obtained by a person of ordinary skill in the art based on embodiments of this application without creative efforts shall fall within the protection scope of this application.

Reference to "an embodiment", "some embodiments", or the like described in the specification of this application indicates that one or more embodiments of this application include a specific feature, structure, or characteristic described with reference to embodiments. Therefore, statements "in an embodiment", "in some embodiments", "in some other embodiments", "in other embodiments", and the like that appear at different places in this specification do not necessarily refer to a same embodiment. Instead, the statements mean "one or more but not all of embodiments", unless otherwise specifically emphasized in another manner. The terms "include", "comprise", "have", and variations thereof all mean "including, but not limited to", unless otherwise particularly specified.

In this application, at least one means one or more, and a plurality of means two or more. The term "and/or" is an association relationship for describing associated objects and represents that three relationships may exist. For example, A and/or B may represent the following three cases: Only A exists, both A and B exist, and only B exists. A and B may be singular or plural. At least one of the following items (pieces) or a similar expression thereof refers to any combination of these items, including any combination of singular items or plural items. For example, at least one of a, b, or c may represent: a, b, c, a-b, a-c, b-c, or a-b-c. a, b, and c each may be singular or plural.

The technical solutions of this application may be applied to a non-terrestrial network (NTN) system such as a satellite communication system or a high altitude platform station (HAPS) communication system. For example, an integrated communication and navigation (IcaN) system, a global navigation satellite system (GNSS), and an ultra-dense low-orbit satellite communication system. The satellite communication system can be integrated with a conventional mobile communication system. For example, the mobile communication system may be a 4th generation (4G) communication system (for example, a long term evolution (LTE) system), a worldwide interoperability for microwave access (WiMAX) communication system, a 5th generation (5G) communication system (for example, a new radio (NR) system), and a future mobile communication system. The technical solutions in embodiments of this application may also be applied to a terrestrial network system, for example, a cellular communication system. The following uses a satellite communication system as an example for description.

A communication system to which embodiments of this application are applicable includes a first communication apparatus, a second communication apparatus, and a third communication apparatus. The first communication apparatus supports access of the second communication apparatus, and provides a communication service for the second communication apparatus. In addition, the first communication apparatus may perform positioning on the second communication apparatus, to implement a requirement of a positioning service. The third communication apparatus may assist the first communication apparatus in positioning the second communication apparatus.

Both the first communication apparatus and the third communication apparatus may be one of a ground base station, a high-altitude base station, a low earth orbit (LEO) satellite, or a non-geostationary earth orbit (NGEO) satellite, a medium-orbit satellite, and a high-orbit satellite. The second communication apparatus may be a terminal device.

The first communication apparatus and the third communication apparatus support functions such as terminal device access and providing a positioning service for the terminal device. For example, the first communication apparatus may be a ground device such as an evolved nodeB (eNB) in a communication system of a 4G access technology, a next generation nodeB (gNB) in a communication system of a 5G access technology, a transmission reception point (transmission reception point, TRP), a relay node, or an access point ( ). Alternatively, the first communication apparatus may be a non-ground device: a high-altitude base station, for example, a device such as a hot air balloon that can provide a wireless access function for a terminal device, a low-orbit satellite, a medium-orbit satellite, or a high-orbit satellite, or may be an unmanned aerial vehicle, or may be a mobile switching center, and a device that functions as a base station in a device-to-device (D2D), vehicle-to-everything (V2X), and machine-to-machine (machine-to-machine, M2M) communication, or the like.

The terminal device may be a device that provides voice or data connectivity for a user. The terminal device is also referred to as user equipment (UE), or may be referred to as a mobile station, a subscriber unit, a station, a terminal equipment (TE), or the like. The terminal device may be a cellular phone (0phone), a personal digital assistant (PDA), a wireless modem, a handheld device, a laptop computer, a cordless phone, a wireless local loop (WLL) station, a tablet computer (aka. pad), an in-vehicle device, a wearable device, a computing device, a drone, or the like. With development of wireless communication technologies, a device that can access a communication system, can communicate with a network side of a communication system, or can communicate with another object by using a communication system may be the terminal device in this embodiment of this application, for example, a terminal device and a car in smart transportation, a household device in a smart household, an electricity meter reading instrument, a voltage monitoring instrument, an environment monitoring instrument, and the like in a smart grid, a video surveillance instrument, a cash register, and the like in an intelligent security network.

FIG. 1 is a schematic diagram of a communication system according to an embodiment of this application. The communication system includes a satellite 1, a terminal device, and a satellite 2. The satellite 1 and the satellite 2 are connected to a core network device. The terminal device is located in a beam coverage area of the satellite 1. The satellite 1 may provide a communication service, a navigation service, and a positioning service for the terminal device by using a beam. The satellite 1 may perform wireless communication with the terminal device by using a broadcast communication signal and a navigation signal, and the satellite 1 may perform wireless communication with the core network device.

The NTN network has the characteristics of dynamic topology structure change, large transmission delay, insignificant near-far effect, and the like. Therefore, to improve positioning accuracy, the satellite 1 serves as a positioning satellite, and the satellite 2 may serve as a cooperative satellite. The satellite 2 may direct a beam to an area range in which the terminal device is located. That is, the area range is covered by beams of the satellite 1 and the satellite 2, so that the satellite 2 can assist the satellite 1 in positioning the terminal device.

The core network device is a device in a core network (CN) or a device in a core network in a future mobile communication architecture. The core network provides functions such as communication connection, authentication, management, and policy control for the terminal device. The core network may further include network elements such as an access and mobility management function (AMF) network element, a session management network element (SMF), an authentication server network element (AUSF), a policy control node (PCF), and a user plane function (UPF) network element.

Embodiments of this application are applicable to a frequency division duplexing (FDD) system or a time division duplexing (TDD) system.

The technical solutions in embodiments of this application are applicable to uplink communication and uplink positioning, and are also applicable to downlink communication and downlink positioning. This is not specifically limited in this application. The following describes the technical solutions in embodiments of this application by using downlink communication and downlink positioning as an example.

Figure 2:
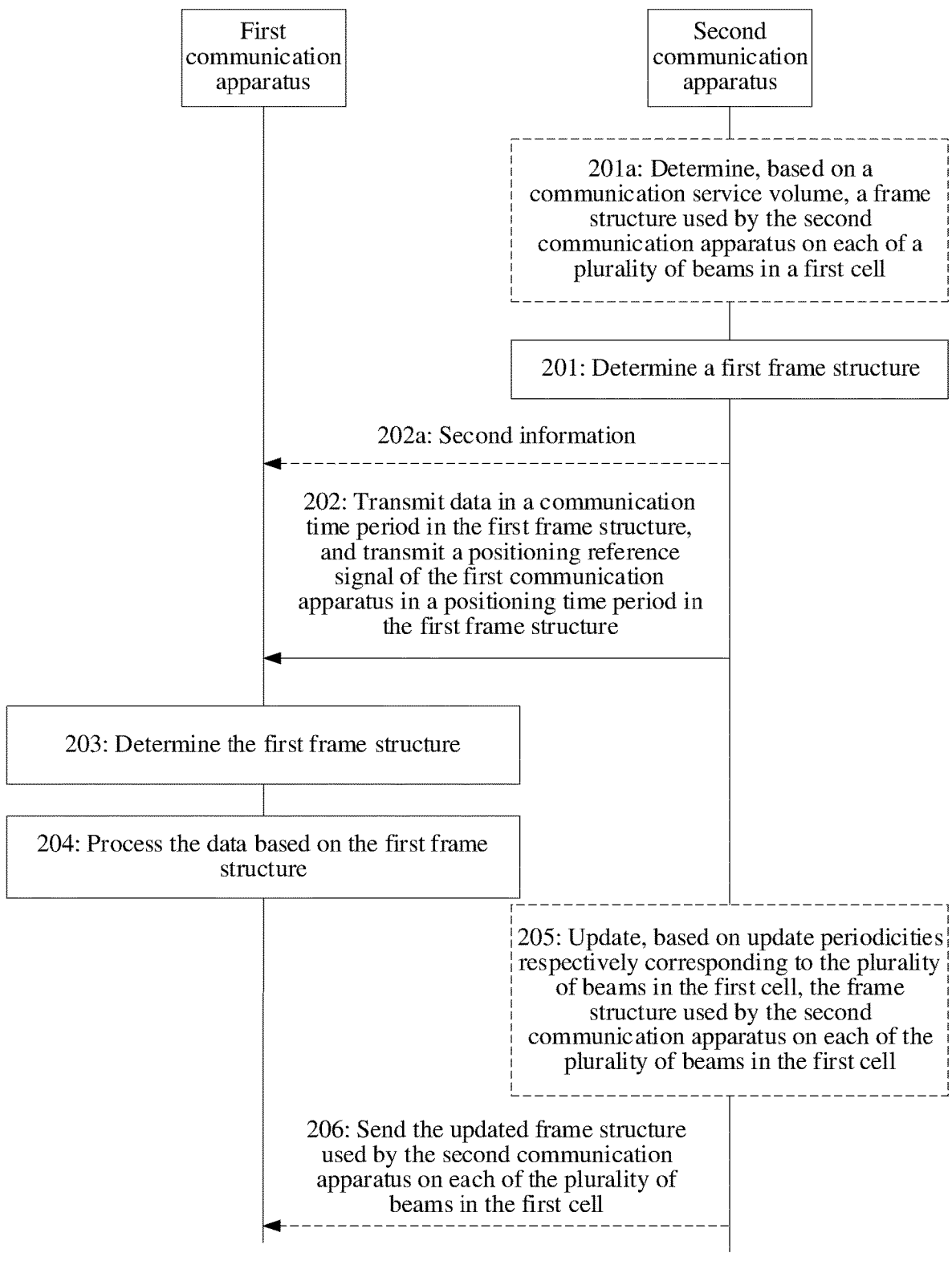
FIG. 2 is a schematic diagram of an embodiment of a communication method according to an embodiment of this application.

FIG. 2 is a schematic diagram of an embodiment of a communication method according to an embodiment of this application. In FIG. 2, the communication method includes the following steps.

201: A second communication apparatus determines a first frame structure.

The first frame structure includes at least one communication time period and at least one positioning time period.

The communication time period occupies one or more time-domain symbols in the first frame structure, and the communication time period is used to transmit data.

The positioning time period occupies one or more time-domain symbols in the first frame structure. The positioning time period is used to transmit a positioning reference signal of the first communication apparatus.

A first switching time period is included between the communication time period and the positioning time period. A $1^{st}$ time-domain symbol occupied by the first switching time period is consecutive to a last time-domain symbol occupied by the communication time period, and a last time-domain symbol occupied by the first switching time period is consecutive to a $1^{st}$ time-domain symbol occupied by the positioning time period.

Alternatively, a second switching time period is included between the positioning time period and the communication time period. A last time-domain symbol occupied by the second switching time period is consecutive to a last time-domain symbol occupied by the positioning time period, and a last time-domain symbol occupied by the second switching time period is consecutive to a $1^{st}$ time-domain symbol occupied by the communication time period.

Before an example of the first frame structure is described, a sequence of communication time periods, a sequence of positioning time periods, a sequence of first switching time periods, and a sequence of second switching time periods in the first frame structure are first described.

The sequence of the communication time periods in the first frame structure is obtained by sequentially sorting the communication time periods included in the first frame structure in a direction from the starting time-domain symbol in the first frame structure to the last time-domain symbol occupied by the first frame structure.

Figures 3A, 3B:
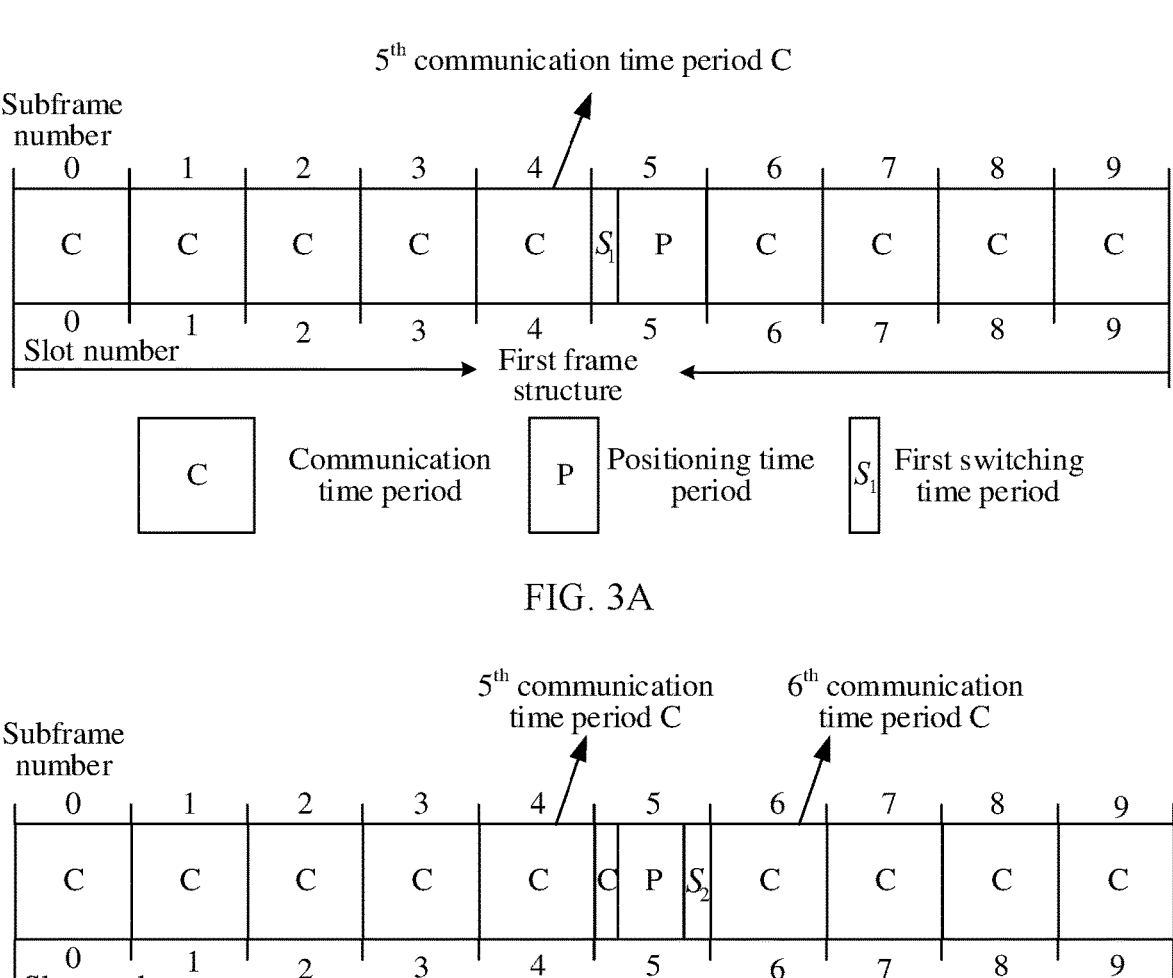
FIG. 3A is a schematic diagram of a first frame structure according to an embodiment of this application.
FIG. 3B is another schematic diagram of a first frame structure according to an embodiment of this application.

For example, as shown in FIG. 3A, a $1^{st}$ communication time period C in a first frame structure is a communication time period that occupies a subframe 0 in the first frame structure. A $2^{nd}$ communication time period C is a communication time period that occupies a subframe 1 in the first frame structure. By analogy, a $6^{th}$ communication time period is a communication time period that occupies a subframe 6 in the first frame structure.

The sequence of the positioning time periods in the first frame structure is obtained by sequentially sorting the positioning time periods included in the first frame structure in a direction from the starting time-domain symbol in the first frame structure to the last time-domain symbol occupied by the first frame structure.

Figures 3C, 3D:
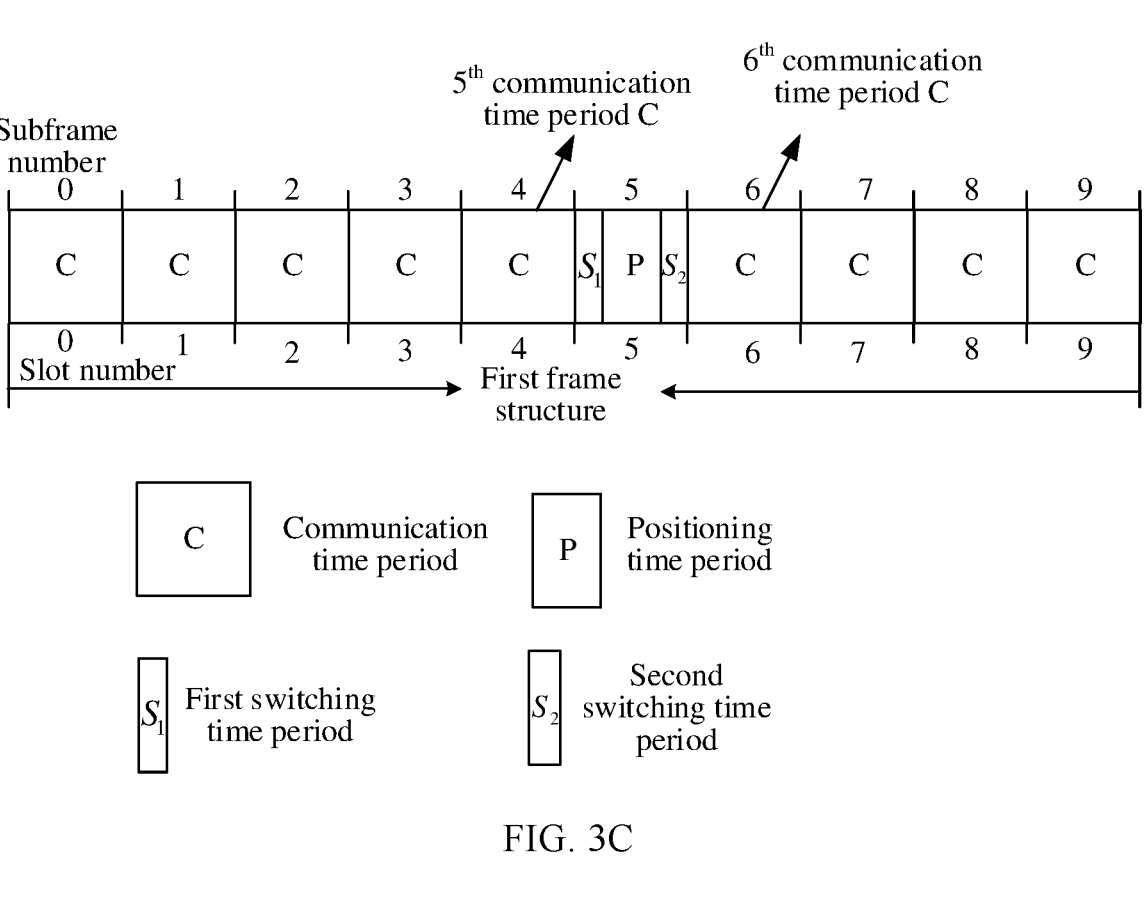
FIG. 3C is another schematic diagram of a first frame structure according to an embodiment of this application.
FIG. 3D is another schematic diagram of a first frame structure according to an embodiment of this application.

For example, as shown in FIG. 3D, a $1^{st}$ positioning time period P is a positioning time period P included in a subframe 5 in a first frame structure. A $2^{nd}$ positioning time period P is a positioning time period P included in a subframe 6 in the first frame structure.

The sequence of the first switching time periods is obtained by sequentially sorting the first switching time periods included in the first frame structure in a direction from the starting time-domain symbol in the first frame structure to the last time-domain symbol occupied by the first frame structure. The sequence of the second switching time periods is obtained by sequentially sorting the second switching time periods included in the first frame structure in a direction from the starting time-domain symbol in the first frame structure to the last time-domain symbol occupied by the first frame structure.

Figures 3E, 3F:
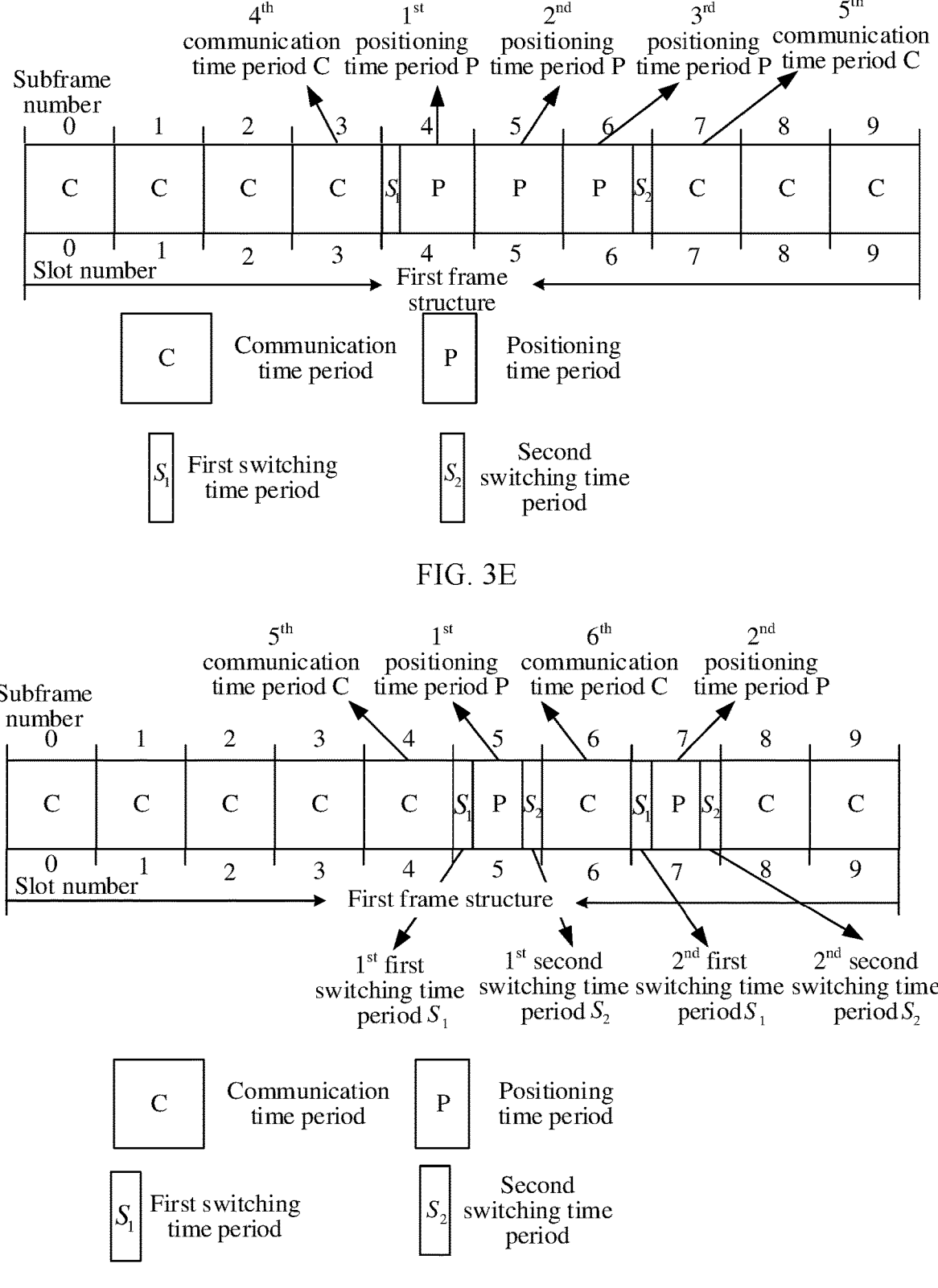
FIG. 3E is another schematic diagram of a first frame structure according to an embodiment of this application.
FIG. 3F is another schematic diagram of a first frame structure according to an embodiment of this application.

For example, as shown in FIG. 3F, a $1^{st}$ first switching time period $S_1$ is a first switching time period $S_1$ included in a subframe 5 in a first frame structure. A $2^{nd}$ first switching time period $S_1$ is a first switching time period $S_1$ included in a subframe 7 in the first frame structure. A $1^{st}$ second switching time period $S_2$ is a second switching time period $S_2$ included in the subframe 5 in the first frame structure. A $2^{nd}$ second switching time period $S_2$ is a second switching time period $S_2$ included in the subframe 7 in the first frame structure.

FIG. 3A is a schematic diagram of a first frame structure according to an embodiment of this application. The first frame structure includes nine communication time periods C and one positioning time period P. It can be learned from FIG. 3A that a first switching time period $S_1$ is included between a $5^{th}$ communication time period in the first frame structure and the positioning time period in the first frame structure.

FIG. 3B is another schematic diagram of a first frame structure according to an embodiment of this application. The first frame structure includes 10 communication time periods C and one positioning time period P. It can be learned from FIG. 3B that a second switching time period $S_2$ is included between the positioning time period in the first frame structure and a $6^{th}$ communication time period in the first frame structure.

FIG. 3C is another schematic diagram of a first frame structure according to an embodiment of this application. The first frame structure includes nine communication time periods C and one positioning time period P. It can be learned from FIG. 3C that a first switching time period $S_1$ is included between a $5^{th}$ communication time period C in the first frame structure and the positioning time period P in the first frame structure, and a second switching time period $S_2$ is included between the positioning time period P in the first frame structure and a $6^{th}$ communication time period C in the first frame structure.

FIG. 3A to FIG. 3C each show an example in which the first frame structure includes one positioning time period. Examples in which the first frame structure includes two positioning time periods and three positioning time periods are separately shown below.

FIG. 3D is another schematic diagram of a first frame structure according to an embodiment of this application. In FIG. 3D, the first frame structure includes eight communication time periods C and two positioning time periods P. A first switching time period $S_1$ is included between a $5^{th}$ communication time period C in the first frame structure and a $1^{st}$ positioning time period P in the first frame structure. A second switching time period $S_2$ is included between a $2^{nd}$ positioning time period in the first frame structure and a $6^{th}$ communication time period in the first frame structure.

FIG. 3E is another schematic diagram of a first frame structure according to an embodiment of this application. In FIG. 3E, the first frame structure includes seven communication time periods C and three positioning time periods P. A first switching time period $S_1$ is included between a $4^{th}$ communication time period C in the first frame structure and a $1^{st}$ positioning time period P in the first frame structure. A second switching time period $S_2$ is included between a $3^{rd}$ positioning time period P and a $5^{th}$ communication time period C in the first frame structure.

It should be noted that the first frame structure includes one or more first switching time periods and/or one or more second switching time periods. With reference to an example in FIG. 3F, the following describes an implementation in which the first frame structure includes two first switching time periods and two second switching time periods.

FIG. 3F is another schematic diagram of a first frame structure according to an embodiment of this application. The first frame structure includes eight communication time periods C and two positioning time periods P. A $1^{st}$ first switching time period $S_1$ is included between a $5^{th}$ communication time period C in the first frame structure and a $1^{st}$ positioning time period P in the first frame structure, and a $1^{st}$ second switching time period $S_2$ is included between the $1^{st}$ positioning time period P in the first frame structure and a $6^{th}$ communication time period C in the first frame structure. A $2^{nd}$ first switching time period $S_1$ is included between the $6^{th}$ communication time period C in the first frame structure and a $2^{nd}$ positioning time period P in the first frame structure. A $2^{nd}$ second switching time $S_2$ is included between the $2^{nd}$ positioning time period P in the first frame structure and a $7^{th}$ communication time period C in the first frame structure.

This embodiment is applicable to the scenario shown in FIG. 1. That is, the first communication apparatus is the satellite 1. The second communication apparatus is the terminal device. The third communication apparatus is the satellite 2. The third communication apparatus assists the first communication apparatus in positioning the second communication apparatus. The satellite 1, the satellite 2, and the terminal device may perform transmission by using the first frame structure. In a first switching time period, the terminal device and the satellite 1 remain silent, that is, the terminal device and the satellite 1 do not perform any operation. The satellite 2 directs a beam of the satellite 2 to an area range in which the terminal device is located, to assist the satellite 1 in positioning the terminal device. In a second switching time period $S_2$, the terminal device and the satellite 1 remain silent, that is, the terminal device and the satellite 1 do not perform any operation. The satellite 2 redirects the beam of the satellite 2 to a beam coverage area of the satellite 2.

Because the satellite 1 and the terminal device remain silent in the first switching time period, a frame structure used by the satellite 1 and the terminal device may not include the first switching time period and/or the second switching time period. That is, in the frame structure used by the satellite 1 and the terminal device, the first switching time period and/or the second switching time period may not be included between a communication time period and a positioning time period, that is, the communication time period and the positioning time period are consecutive.

For example, the satellite 1 and the terminal device may use the frame structure shown in FIG. 3B, and the satellite 2 may use the frame structure shown in FIG. 3C. The satellite 1 and the terminal device perform communication transmission in the $6^{th}$ communication time period in the frame structure shown in FIG. 3B. In the first switching time period in the frame structure shown in FIG. 3C, the satellite 2 directs the beam of the satellite 2 to the area range in which the terminal device is located and that is in the satellite 1. Therefore, an interruption time of a communication service between the terminal device and the satellite 1 is minimized.

In a possible implementation, the communication time period is a communication subframe, and the positioning time period is a positioning subframe. The first switching time period is located in the communication subframe or the positioning subframe. The second switching time period is located in the communication subframe or the positioning subframe.

For example, as shown in FIG. 3C, a subcarrier spacing used in the first frame structure is 15 kilohertz (kHz), and the first frame structure includes 10 subframes. Each subframe includes one slot. Each slot includes 14 time-domain symbols. It can be learned from FIG. 3C that the communication time period C may be a communication subframe. Therefore, it can be learned that the communication subframe includes 14 time-domain symbols. That is, a length of one communication time period is a length of one subframe. The positioning time period P may be a positioning subframe. The positioning subframe includes 14 time-domain symbols. The first switching time period $S_1$ is located in the positioning subframe, and the second switching time period $S_2$ is located in the positioning subframe. That is, the positioning subframe shown in FIG. 3C includes the positioning time period P, the first switching time $S_1$, and the second switching time period $S_2$.

Figure 3G:
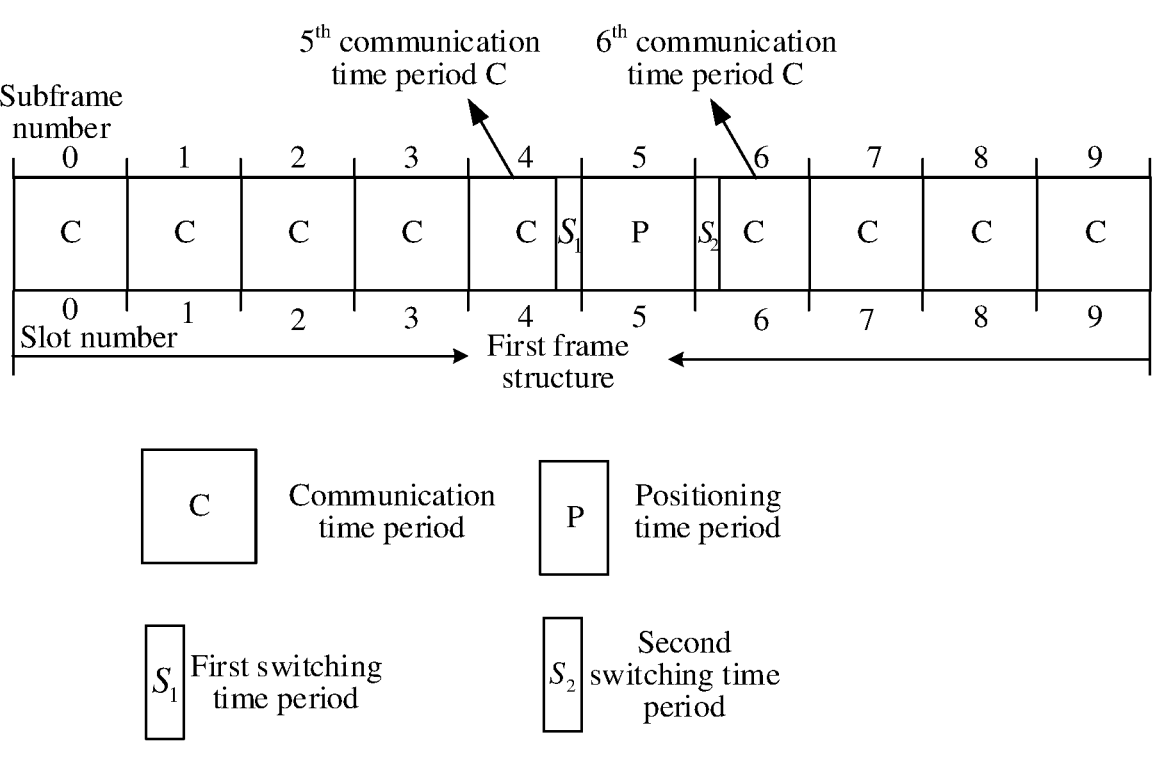
FIG. 3G is another schematic diagram of a first frame structure according to an embodiment of this application.

For example, as shown in FIG. 3G, a subcarrier spacing used in the first frame structure is 15 kHz, and the first frame structure includes 10 subframes. Each subframe includes one slot. Each slot includes 14 time-domain symbols. It can be learned from FIG. 3G that the communication time period C may be a communication subframe. Therefore, it can be learned that the communication subframe includes 14 time-domain symbols. That is, a length of one communication time period is a length of one subframe. The positioning time period P may be a positioning subframe, and the positioning subframe includes 14 time-domain symbols. That is, a length of one positioning time period is a length of one subframe. A $5^{th}$ communication subframe in the first frame structure includes the $5^{th}$ communication time period and the first switching time period $S_1$. A $6^{th}$ communication subframe in the first frame structure includes the $6^{th}$ communication time period and the second switching time period $S_2$.

Figure 3H:
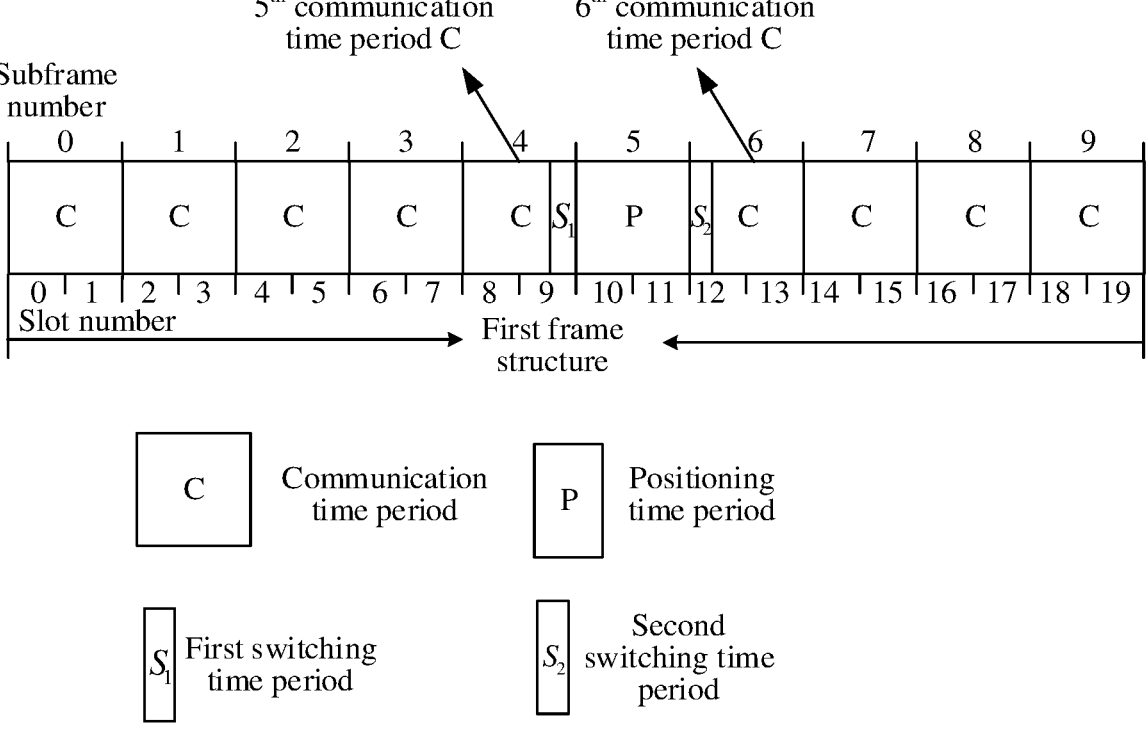
FIG. 3H is another schematic diagram of a first frame structure according to an embodiment of this application.

For example, as shown in FIG. 3H, a subcarrier spacing used in the first frame structure is 30 kHz, and the first frame structure includes 10 subframes. Each subframe includes two slots. Each slot includes 14 time-domain symbols. It can be learned from FIG. 3H that the communication time period C may be a communication subframe. Therefore, it can be learned that the communication subframe includes 28 time-domain symbols. That is, a length of one communication time period is a length of one subframe. The positioning time period P may be a positioning subframe. Therefore, it can be learned that the positioning subframe includes 28 time-domain symbols. That is, a length of one positioning time period is a length of one subframe. A $5^{th}$ communication subframe in the first frame structure includes the $5^{th}$ communication time period and the first switching time period $S_1$. A $6^{th}$ communication subframe in the first frame structure includes the $6^{th}$ communication time period and the second switching time period $S_2$.

It should be noted that in actual application, a quantity of positioning subframes included in the first frame structure is usually 1, 2, 4, 6, or 8. In this way, compatibility with a quantity of positioning subframes configured in a frame structure of an existing communication system can be implemented, thereby improving practicability of the solution.

In another possible implementation, the communication time period is a communication slot, and the positioning time period is a positioning slot. The first switching time period is located in the communication slot or the positioning slot. The second switching time period is located in the communication slot or the positioning slot.

For example, as shown in FIG. 3C, a subcarrier spacing used in the first frame structure is 15 kHz, and the first frame structure includes 10 subframes. Each subframe includes one slot. Each slot includes 14 time-domain symbols. It can be learned from FIG. 3C that the communication time period C may be a communication slot. Therefore, it can be learned that the communication slot includes 14 time-domain symbols. That is, a length of one communication subframe is a length of one slot. The positioning time period P may be a positioning slot. The positioning slot includes 14 time-domain symbols. The first switching time period $S_1$ is located in the positioning slot, and the second switching time period $S_2$ is located in the positioning slot. That is, the positioning slot shown in FIG. 3C includes the positioning time period P, the first switching time $S_1$, and the second switching time period $S_2$.

For example, as shown in FIG. 3G, a subcarrier spacing used in the first frame structure is 15 kHz, and the first frame structure includes 10 subframes. Each subframe includes one slot. Each slot includes 14 time-domain symbols. It can be learned from FIG. 3G that the communication time period C may be a communication slot. Therefore, it can be learned that the communication slot includes 14 time-domain symbols. That is, a length of one communication time period is a length of one subframe. The positioning time period P may be a positioning slot, and the positioning slot includes 14 time-domain symbols. That is, a length of one positioning time period is a length of one slot. A $5^{th}$ communication slot in the first frame structure includes the $5^{th}$ communication time period and the first switching time period $S_1$. A $6^{th}$ communication slot in the first frame structure includes the $6^{th}$ communication time period and the second switching time period $S_2$.

Figures 3I, 4:
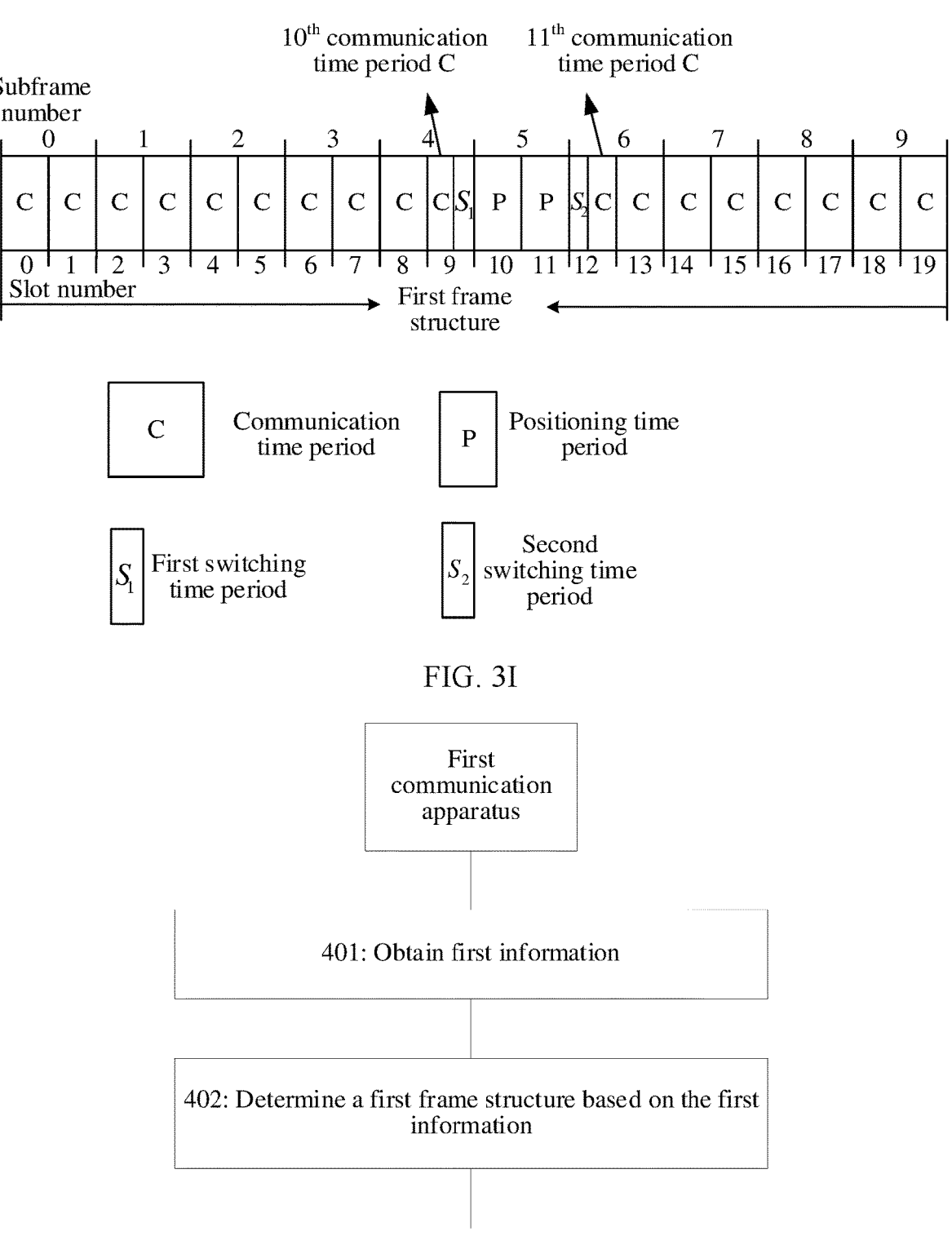
FIG. 3I is another schematic diagram of a first frame structure according to an embodiment of this application.
FIG. 4 is a schematic diagram of another embodiment of a communication method according to an embodiment of this application.

For example, as shown in FIG. 3I, a subcarrier spacing used in the first frame structure is 30 kHz, and the first frame structure includes 10 subframes. Each subframe includes two slots. Each slot includes 14 time-domain symbols. It can be learned from FIG. 3I that the communication time period C may be a communication slot. Therefore, it can be learned that the communication slot includes 14 time-domain symbols. That is, a length of one communication time period is a length of one slot. The positioning time period P may be a positioning slot. Therefore, it can be learned that the positioning slot includes 14 time-domain symbols. That is, a length of one positioning time period is a length of one slot. A $10^{th}$ communication slot in the first frame structure includes a $10^{th}$ communication time period and the first switching time period $S_1$. A $11^{th}$ communication slot in the first frame structure includes a $11^{th}$ communication time period and the second switching time period $S_2$.

A length of the first switching time period may be in a unit of a symbol, a slot, or the like. This is not specifically limited in this application.

In this embodiment, there are a plurality of possible implementations for the lengths of the first switching time period and the second switching time period. The following shows two possible implementations.

Implementation 1: If a subcarrier spacing used in the first frame structure is 15 kilohertz kHz, the first switching time period occupies one time-domain symbol in the first frame structure, and the second switching time period occupies one time-domain symbol in the first frame structure; and if a subcarrier spacing used in the first frame structure is 30 kilohertz kHz, the first switching time period occupies two time-domain symbols in the first frame structure, and the second switching time period respectively occupies two time-domain symbols in the first frame structure.

For example, as shown in FIG. 3C, a subcarrier spacing used in the first frame structure is 15 kHz, and a length of the first switching time period $S_1$ is one time-domain symbol. A length of the second switching time period $S_2$ is one time-domain symbol.

For example, as shown in FIG. 3H, a subcarrier spacing used in the first frame structure is 30 kHz, and a length of the first switching time period $S_1$ is two time-domain symbols. A length of the second switching time period $S_2$ is two time-domain symbols.

Implementation 2: If a subcarrier spacing used in the first frame structure is 15 kilohertz kHz, the first switching time period occupies two time-domain symbols in the first frame structure, and the second switching time period occupies two time-domain symbols in the first frame structure; and if a subcarrier spacing used in the first frame structure is 30 kilohertz kHz, the first switching time period occupies four time-domain symbols in the first frame structure, and the second switching time period respectively occupies four time-domain symbols in the first frame structure.

For example, as shown in FIG. 3C, a subcarrier spacing used in the first frame structure is 15 kHz, and a length of the first switching time period $S_1$ is two time-domain symbols. A length of the second switching time period $S_2$ is two time-domain symbols.

For example, as shown in FIG. 3H, a subcarrier spacing used in the first frame structure is 30 kHz, and a length of the first switching time period $S_1$ is four time-domain symbols. A length of the second switching time period $S_2$ is four time-domain symbols.

Through experiment data validation, in both the first switching time period and the second switching time period of the foregoing implementation 1 or implementation 2, the communication apparatus can generally complete a related switching operation. For example, in the first switching time period, the satellite 2 shown in FIG. 1 directs a beam to an area range in which the terminal device is located. In the second switching time period, the satellite 2 shown in FIG. 1 redirects the beam to a beam coverage area of the satellite 2. Therefore, communication and positioning are performed by using the first frame structure provided in this application, so that positioning performance can be improved, and reliability of a communication service and a positioning service can be ensured. In addition, the foregoing implementation 1 or implementation 2 can minimize interruption time of the communication service and the positioning service, thereby minimizing system overheads.

In this embodiment, the length of the first switching time period and the length of the second switching time period are designed based on a hardware capability of the communication apparatus. If the hardware capability of the communication apparatus is strong, the length of the first switching time period and the length of the second switching time period may be small. If the hardware capability of the communication apparatus is poor, the length of the first switching time period and the length of the second switching time period should be large. The hardware capability may be represented by a configuration of a CPU and a configuration of an antenna of the communication apparatus.

For example, in the scenario shown in FIG. 1, if the satellite 1, the terminal device, and the satellite 2 use the first frame structure shown in FIG. 3C, in the first switching time period $S_1$, the terminal device remains silent, and the satellite 2 directs the beam of the satellite 2 to the area range in which the terminal device is located. In this case, if a hardware capability of the satellite 2 is strong, the satellite 2 may direct, in a short time, the beam of the satellite 2 to the area range in which the terminal device is located. That is, the length of the first switching time period $S_1$ may be short. In the second switching time period $S_2$, the terminal device remains silent, and the satellite 2 redirects the beam of the satellite 2 to the beam coverage area of the satellite 2. In this case, if the hardware capability of the satellite 2 is strong, the satellite 2 may redirect the beam of the satellite 2 to the beam coverage area of the satellite 2 in a short time.

202: The second communication apparatus transmits data in a communication time period in the first frame structure, and transmits a positioning reference signal of a first communication apparatus in a positioning time period in the first frame structure.

Specifically, the second communication apparatus may send data in the communication time period in the first frame structure. Correspondingly, the first communication apparatus receives, in the communication time period in the first frame structure, the data sent by the first communication apparatus. If the second communication apparatus receives a positioning request from the first communication apparatus, the second communication apparatus sends the positioning reference signal to the first communication apparatus in the positioning time period in the first frame structure. Correspondingly, the first communication apparatus receives, in the positioning time period in the first frame structure, the positioning reference signal sent by the first communication apparatus.

For example, with reference to the communication system shown in FIG. 1, the first communication apparatus is the satellite 1, and the second communication apparatus is the terminal device. The terminal device accesses the satellite 1, so that the satellite 1 may provide a communication service, a positioning service, and the like for the terminal device. The terminal device may send a positioning request to the satellite 1. In this case, the satellite may send a positioning reference signal to the terminal device in the positioning time period in the first frame structure, and send data to the terminal device in the communication time period.

203: The first communication apparatus determines the first frame structure.

The following describes step 203 with reference to FIG. 4. Step 203 specifically includes step 401 and step 402.

401: The first communication apparatus obtains first information.

Specifically, the second communication apparatus sends the first information to the first communication apparatus. Correspondingly, the first communication apparatus receives the first information from the second communication apparatus. The first information indicates the first frame structure.

For example, the first information includes a sequence number corresponding to the first frame structure. The first communication apparatus determines the first frame structure corresponding to the sequence number. The following provides a description with reference to Table 1.

TABLE 1

| Sequence number | Frame structure |
| --- | --- |
| 0 | CCCCCCCCC |
| 1 | CCCCCS$_1$PS$_2$CCCC |
| 2 | CCCCCS$_1$PS$_2$CCCC |
| 3 | CCCCCS$_1$PPS$_2$CCC |
| . . . | . . . |
| M-1 | . . . |

"C" in Table 1 represents the communication time period. P represents the positioning time period. "S$_1$" is the first switching time period. S$_2$ is the second switching time period. M is an integer greater than or equal to 4.

Lengths of each communication time period, the positioning time period, the first switching time period, and the second switching time period may be agreed in advance. For example, the communication time period is a communication subframe, and the positioning time period is a positioning subframe. The length of each of the first switching time period and the second switching time period is one time-domain symbol.

Table 1 is preconfigured in the first communication apparatus, and the first communication apparatus determines a corresponding frame structure based on the sequence number included in the first information. For example, if the sequence number included in the first information is 1, the first communication apparatus may determine, based on Table 1, that a frame structure corresponding to the sequence number 1 is CCCCCS$_1$PS$_2$CCCC.

In a possible implementation, the first information further indicates lengths respectively corresponding to the first switching time period and the second switching time period in the first frame structure.

For example, when the length of the first switching time period is the same as the length of the second switching time period, the first information includes the sequence number. The sequence number indicates the first frame structure and a length of each switching time period in the first frame structure. The following describes the implementation with reference to Table 2.

TABLE 2

| Sequence number | Frame structure | Length of a switching time period |
| --- | --- | --- |
| 0 | CCCCCCCCC | 0 |
| 1 | CCCCCS$_1$PS$_2$CCCC | 1 |

TABLE 2-continued

| Sequence number | Frame structure | Length of a switching time period |
| --- | --- | --- |
| 2 | CCCCCS$_1$PS$_2$CCCC | 2 |
| 3 | CCCCCS$_1$PPS$_2$CCC | 1 |
| . . . | . . . | . . . |
| L-1 | . . . | . . . |

"C" in Table 2 represents the communication time period. P indicates the positioning time period. "S$_1$" is the first switching time period. "S$_2$" is the second switching time period. L is an integer greater than or equal to 4. A unit of the length of the switching time period in Table 2 is a time-domain symbol.

For example, the first frame structure corresponding to the sequence number 1 in Table 2 is CCCCCS$_1$PS$_2$CCCC, and the length of the switching time period is 1. Therefore, it can be learned that in the first frame structure, the length of each switching time period is one time-domain symbol. That is, the length of S$_1$ in CCCCCS$_1$PS$_2$CCCC is one time-domain symbol, and the length of S$_2$ in is CCCCCS$_1$PS$_2$CCCC one time-domain symbol.

Table 2 is preconfigured in the first communication apparatus, and the first communication apparatus determines a corresponding frame structure and a length of a switching time period based on the sequence number included in the first information. For example, if the sequence number included in the first information is 2, the first communication apparatus may determine, based on Table 2, that a frame structure corresponding to the sequence number 1 is CCCCCS$_1$PS$_2$CCCC, and a length of each switching time period in the frame structure is two time-domain symbols.

For example, when the length of the first switching time period is different from the length of the second switching time period, the first information includes a sequence number. The sequence number indicates the first frame structure, and the length of the first switching time period and the length of the second switching time period in the first frame structure. For example, the following describes the implementation with reference to Table 3.

TABLE 3

| Sequence number | Frame structure | Length of a first switching time period | Length of a second switching time period |
| --- | --- | --- | --- |
| 0 | CCCCCCCCC | 0 | 0 |
| 1 | CCCCCS$_1$PS$_2$CCCC | 1 | 2 |
| 2 | CCCCCS$_1$PS$_2$CCCC | 2 | 1 |
| 3 | CCCCCS$_1$PPS$_2$CCC | 1 | 2 |
| . . . | . . . | . . . | . . . |
| L-1 | . . . | . . . | . . . |

"C" in Table 3 represents the communication time period. P represents the positioning time period. "S$_1$" is the first switching time period. "S$_2$" is the second switching time period. L is an integer greater than or equal to 4. A unit of the length of the switching time period in Table 2 is a time-domain symbol.

For example, the first frame structure corresponding to the sequence number 1 in Table 3 is $CCCCCS_1PS_2CCCC$, the length of the first switching time period is 1, and the length of the second switching time period is 2. That is, the length of $S_1$ in $CCCCCS_1PS_2CCCC$ is one time-domain symbol, and the length of $S_2$ in $CCCCCS_1PS_2CCCC$ is two time-domain symbols.

In another possible implementation, the second communication apparatus sends third information to the first communication apparatus. Correspondingly, the first communication apparatus receives the third information sent by the second communication apparatus.

The third information indicates the lengths respectively corresponding to the first switching time period and the second switching time period in the first frame structure.

For example, if the length of the first switching time period is the same as the length of the second switching time period in the first frame structure, the third information may directly indicate the length of the switching time period in the first frame structure. A type of a switching time period includes the first switching time period and the second switching time period. For example, the first frame structure is $CCCCCS_1PS_2CCCC$, and the third information indicates that the length of the switching time period in the first frame structure is one time-domain symbol. Therefore, it can be learned that the length of $S_1$ in $CCCCCS_1PS_2CCCC$ is one time-domain symbol, and the length of $S_2$ in $CCCCCS_1PS_2CCCC$ is one time-domain symbol.

For example, if the length of the first switching time period and the length of the second switching time period in the first frame structure are different, the third information may separately indicate the length of the first switching time period and the length of the second switching time period. For example, the first frame structure is $CCCCCS_1PPS_2CCC$, and the third information indicates that the first switching time period is one time-domain symbol, and the length of the second switching time period is two time-domain symbols. Therefore, it can be learned that the length of $S_1$ in $CCCCCS_1PPS_2CCC$ is one time-domain symbol, and the length of $S_2$ in $CCCCCS_1PS_2CCCC$ is one time-domain symbol.

Optionally, the third information is carried by using RRC signaling or DCI signaling.

402: The first communication apparatus determines a first frame structure based on the first information.

For example, the first information includes a sequence number corresponding to the first frame structure. The first communication apparatus determines the first frame structure based on the sequence number corresponding to the first frame structure.

Optionally, the first communication apparatus may further determine a length of each switching time period in the first frame structure based on the first information. For specific related descriptions, refer to the related descriptions in the foregoing step 401. Details are not described herein again.

In this embodiment, a configuration periodicity in which the second communication apparatus configures the first frame structure for the first communication apparatus may be 160 ms (milliseconds), 320 ms, 640 ms, or 1280 ms. The configuration periodicity of the first frame structure may also be understood as a configuration periodicity of the positioning time period in the first frame structure. If the first communication apparatus has no positioning requirement, a frame structure configured by the second communication apparatus for the first communication apparatus may include only a communication time period.

204: The first communication apparatus processes the data based on the first frame structure.

Specifically, the first communication apparatus determines the communication time period and the positioning time period in the first frame structure. The first communication apparatus may receive the data in the communication time period in the first frame structure, and parse information about the data.

If the first communication apparatus sends a positioning request to the second communication apparatus, the first communication apparatus may receive, in the positioning time period, a positioning reference signal sent by the second communication apparatus, and measure the positioning reference signal to obtain a measurement result. The first communication apparatus determines a location of the first communication apparatus based on the measurement result. Alternatively, the first communication apparatus feeds back the measurement result to the second communication apparatus. In this way, the second communication apparatus may determine a location of the first communication apparatus based on the measurement result, and then feed back the location of the terminal device to the terminal device.

In this embodiment, in a process in which the second communication apparatus performs positioning on the first communication apparatus, a third communication apparatus needs to assist the second communication apparatus. The second communication apparatus may send the first information to the third communication apparatus. Alternatively, the second communication apparatus sends, to the third communication apparatus, time information of the positioning time period included in the first frame structure. In this way, the third communication apparatus may assist the second communication apparatus in positioning the first communication apparatus in the positioning time period. Therefore, positioning performance of the first communication apparatus is improved, and reliability of a communication service and a positioning service is ensured.

For example, as shown in FIG. 1, the satellite 1, the satellite 2, and the terminal device perform communication and positioning by using the first frame structure shown in FIG. 3A. The satellite 1 communicates with the terminal device in the first communication time period to the fifth communication time period in the first frame structure. In the first switching time period $S_1$, the satellite 1 and the terminal device remain silent. The satellite 2 directs, in the first switching time period $S_1$, the beam of the satellite 2 to the area range in which the terminal device is located. The satellite 1 and the satellite 2 separately send positioning reference signals to the terminal device in the positioning time period. The terminal device separately receives the positioning reference signal from the satellite 1 and the positioning reference signal from the satellite 2 in the positioning time period. The terminal device separately measures the positioning reference signal from the satellite 1 and the positioning reference signal from the satellite 2, to obtain a first measurement result and a second measurement result. The terminal device determines a location of the terminal device based on the first measurement result and the second measurement result. Alternatively, the terminal device sends the first measurement result and the second measurement result to the satellite 1. The satellite 1 determines a location of the terminal device based on the first measurement result and the second measurement result, and then feeds back the location of the terminal device to the terminal device.

In this embodiment of this application, the first frame structure includes the communication time period used for data transmission and the positioning time period used for positioning. In this way, based on the first frame structure, the second communication apparatus may perform positioning on the first communication apparatus, to support a positioning requirement of a beam hopping-based NTN network or a terrestrial communication network. In addition, the first switching time period is included between the communication time period and the positioning time period, or the second switching time period is included between the positioning time period and the communication time period. Positioning performance can be improved, and reliability of a communication service and a positioning service can be ensured.

In this embodiment of this application, in step 201 of the embodiment shown in FIG. 2, optionally, the first frame structure includes M flexible time periods.

An $m^{th}$ flexible time period in the M flexible time periods is the communication time period or the positioning time period. m is an integer greater than or equal to 1 and less than or equal to M. M is a positive integer.

The flexible time period may be used to transmit data, or may be used to transmit a positioning reference signal of the first communication apparatus. Specifically, the flexible time period is configured by the second communication apparatus. The second communication apparatus may indicate types of the M flexible time periods in the first frame structure to the first communication apparatus by using the first information in step 401.

It should be noted that if a type configured for the $m^{th}$ flexible time period is different from a type of a previous time period of the $m^{th}$ flexible time period, the $m^{th}$ flexible time period includes a switching time period. If the type configured for the $m^h$ flexible time period is the same as the type of the previous time period of the $m^{th}$ flexible time period, the $m^h$ flexible time period does not need to include the switching time period.

Further, if the type configured for the $m^{th}$ flexible time period is different from a type of a next time period of the $m^{th}$ flexible time period, the $m^{th}$ flexible time period includes a switching time period. If the type configured for the $m^{th}$ flexible time period is the same as the type of the next time period of the $m^{th}$ flexible time period, the $m^{th}$ flexible time period does not need to include the switching time period.

A type of a time period includes the communication time period and the positioning time period.

A type of a switching time period includes the first switching time period and the second switching time period. Specifically, the type of each switching time period in the first frame structure should be determined with reference to the type of the $m^{th}$ flexible time period, the type of the previous time period of the $m^{th}$ flexible time period, and the type of the next time period of the $m^{th}$ flexible time period.

For example, when the $m^{th}$ flexible time period is configured as the positioning time period, and the previous time period of the $m^{th}$ flexible time period is the communication time period, the $m^{th}$ flexible time period includes the first switching time period and the positioning time period. In addition, a $1^{st}$ time-domain symbol of the first switching time period is consecutive to a last time-domain symbol of the previous time period of the $m^{th}$ flexible time period, and a last time-domain symbol of the first switching time period is consecutive to a $1^{st}$ time-domain symbol of the positioning time period included in the $m^{th}$ flexible time period.

Optionally, the next time period of the $m^{th}$ flexible time period is the positioning time period included in the $m^{th}$ flexible time period, and the $m^{th}$ flexible time period further includes the second switching time period. A $1^{st}$ time-domain symbol of the second switching time period is consecutive to a last time-domain symbol of the positioning time period, and a last time-domain symbol of the second switching time period is consecutive to the next time period of the $m^{th}$ flexible time period.

Figure 5A:
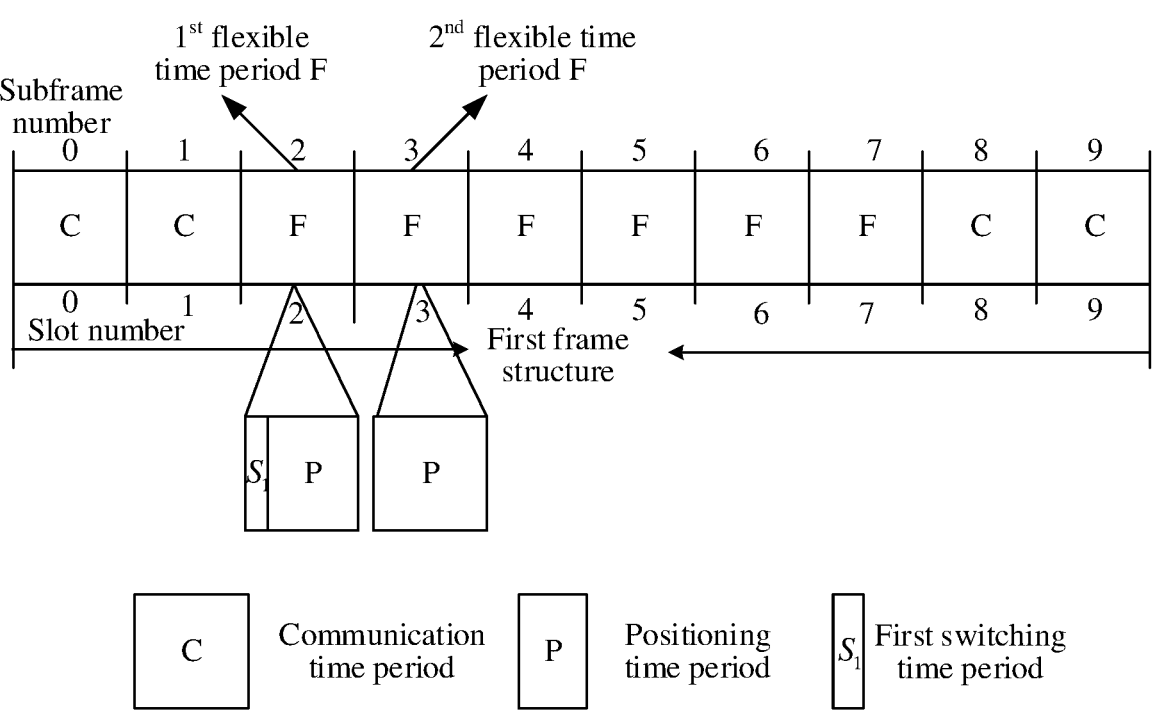
FIG. 5A is another schematic diagram of a first frame structure according to an embodiment of this application.

For example, as shown in FIG. 5A, a first frame structure includes one or more communication time periods C and one or more flexible time periods F. The second communication apparatus sends the first information to the first communication apparatus. The first information indicates that a $1^{st}$ flexible time period F in the first frame structure is a positioning time period, and a $2^{nd}$ flexible time period F is a positioning time period. In this case, it can be learned that a type of the $1^{st}$ flexible time period F is different from a type of a $2^{nd}$ communication time period in the first frame structure. Therefore, the $1^{st}$ flexible time period F includes a first switching time period $S_1$. The type of the $1^{st}$ flexible time period F is the same as a type of the $2^{nd}$ flexible time period F. Therefore, the $2^{nd}$ flexible time period F does not need to include a switching time period, that is, the entire $2^{nd}$ flexible time period F may be used for positioning.

Figure 5B:
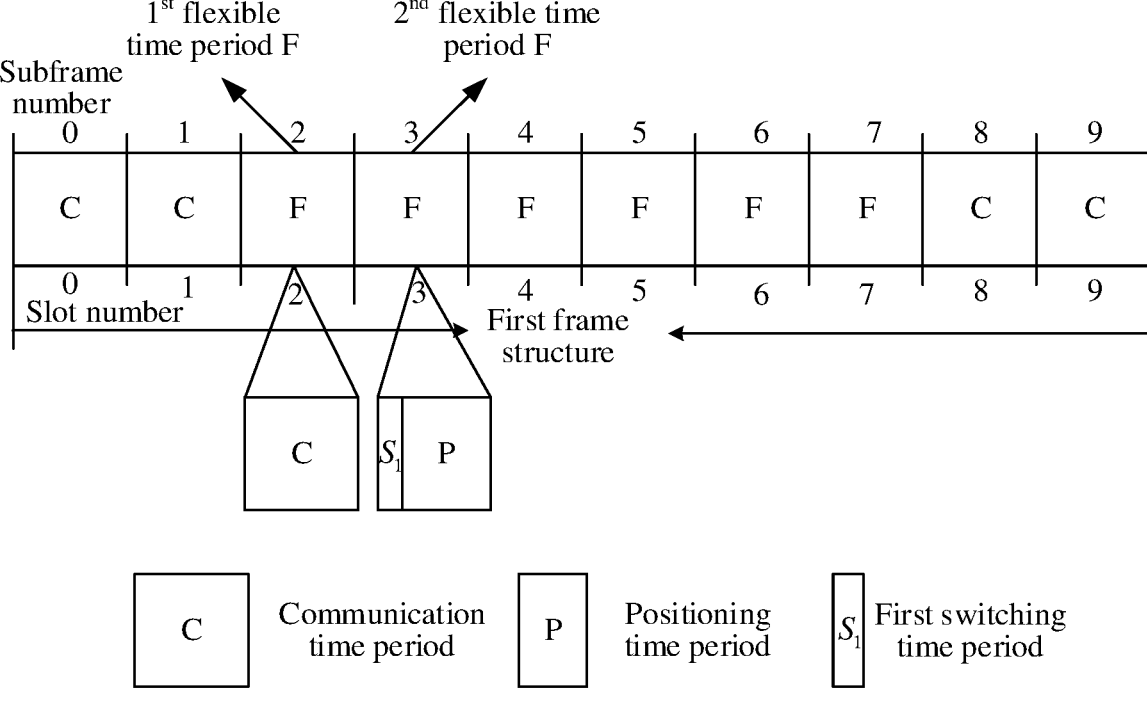
FIG. 5B is another schematic diagram of a first frame structure according to an embodiment of this application.

For another example, as shown in FIG. 5B, a first frame structure includes one or more communication time periods C and one or more flexible time periods F. The second communication apparatus sends the first information to the first communication apparatus. The first information indicates that a $1^{st}$ flexible time period F in the first frame structure is a communication time period, and a $2^{nd}$ flexible time period F is a positioning time period. In this case, it can be learned that a type of the $1^{st}$ flexible time period F is the same as a type of a $2^{nd}$ communication time period in the first frame structure. Therefore, the $1^{st}$ flexible time period F does not need to include a switching time period, that is, the entire $1^{st}$ flexible time period F may be used for communication. A type of the $2^{nd}$ flexible time period F is different from the type of the $1^{st}$ flexible time period F. Therefore, the $2^{nd}$ flexible time period F includes a first switching time period $S_1$.

Figure 5C:
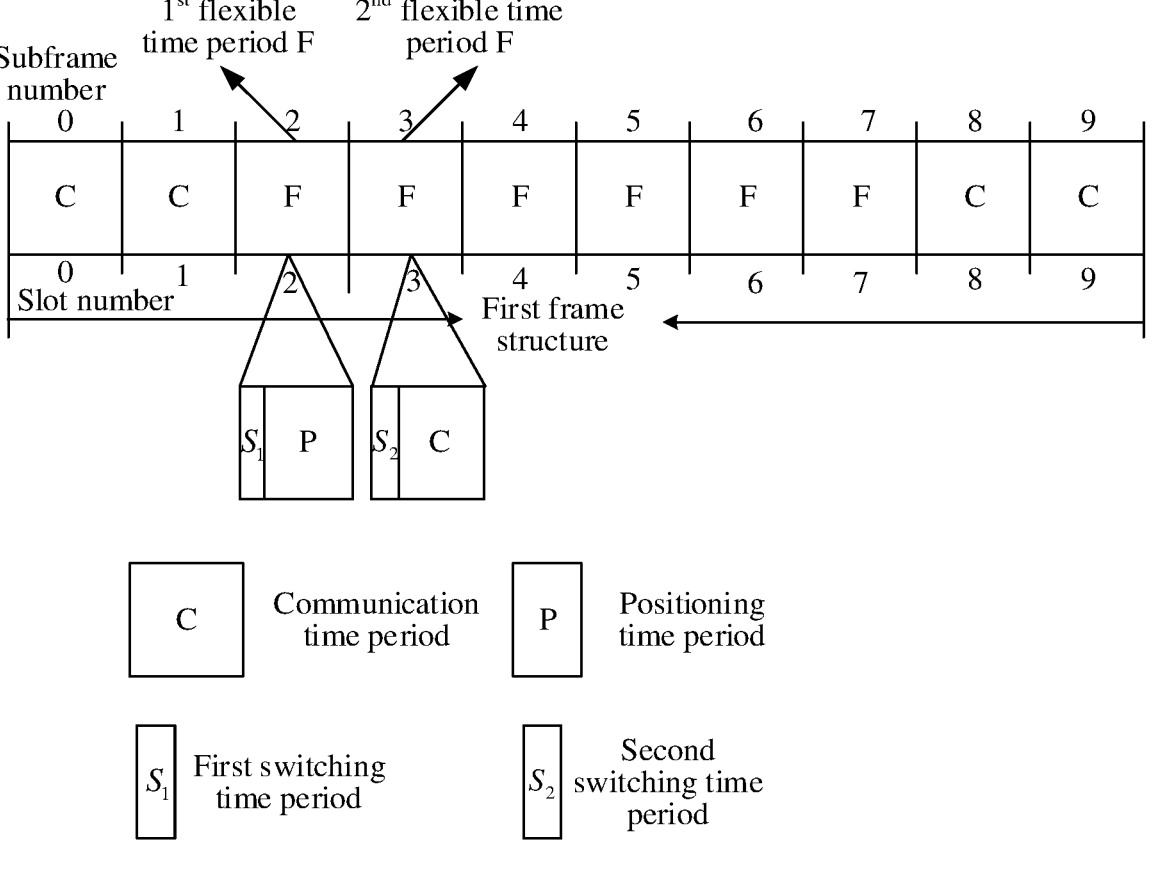
FIG. 5C is another schematic diagram of a first frame structure according to an embodiment of this application.

For another example, as shown in FIG. 5C, a first frame structure includes one or more communication time periods C and one or more flexible time periods F. The second communication apparatus sends the first information to the first communication apparatus. The first information indicates that a $1^{st}$ flexible time period F is a positioning time period, and a $2^{nd}$ flexible time period F is a communication time period. In this case, it can be learned that a type of the $1^{st}$ flexible time period F is different from a type of a $2^{nd}$ communication time period. Therefore, the $1^{st}$ flexible time period F includes a first switching time period $S_1$. A type of the $2^{nd}$ flexible time period F is different from the type of the $1^{st}$ flexible time period F. Therefore, the $2^{nd}$ flexible time period F includes a second switching time period $S_2$.

In each of FIG. 5A to FIG. 5C, an example in which the first information indicates the type of the $1^{st}$ flexible time period and the type of the $2^{nd}$ flexible time period is used for description. Other flexible time periods are also similar, and details are not described one by one.

In this embodiment, the flexible time period is a flexible subframe, a flexible slot, or a time period of another length. This is not specifically limited in this application.

For example, as shown in FIG. 5A, a subcarrier spacing used in the first frame structure is 15 kHz, and the first frame structure includes 10 subframes. Each subframe includes one slot, and each slot includes 14 time-domain symbols. One flexible time period F is one flexible subframe. In FIG.

5A, one subframe includes one slot. Therefore, one flexible time period F may also be considered as one flexible slot.

In this implementation, the embodiment shown in FIG. 2 further includes step 202a, and step 202a is performed before step 203.

202a: The second communication apparatus sends second information to the first communication apparatus. Correspondingly, the first communication apparatus receives the second information from the second communication apparatus.

The second information indicates the M flexible time periods in the first frame structure.

Specifically, the second communication apparatus indicates locations of the M flexible time periods in the first frame structure to the first communication apparatus by using the second information. In this way, the first communication apparatus can determine which time periods in the first frame structure are flexible time periods, so that when the second communication apparatus subsequently configures the types of the M flexible time periods, the first communication apparatus can accurately determine the types of the M flexible time periods in the first frame structure.

For example, as shown in FIG. 5A, the second communication apparatus indicates, to the first communication apparatus, that a subframe 2 to a subframe 7 in the first frame structure are all flexible subframes.

In a possible implementation, the second information is carried in RRC signaling or DCI signaling.

In this embodiment, the first frame structure includes the M flexible time periods. The flexible time period may be used to transmit data, or may be used to transmit a positioning reference signal of the first communication apparatus. Specifically, the flexible time period is configured by the second communication apparatus. That is, the first frame structure provided in this embodiment of this application supports flexible configuration of the communication time period and the positioning time period. The first frame structure designed based on this implementation is more flexible and more practical.

In this embodiment of this application, optionally, the step of the first communication apparatus obtaining the first information in step 401 of FIG. 4 includes: The first communication apparatus receives a first message. The first message includes the first information.

Optionally, the first message includes a positioning enhancement message information element, and the first information is located in the positioning enhancement message information element.

A possible format of the positioning enhancement message information element is shown below by using code. It should be noted that the following code is merely an example of the possible format of the positioning enhancement message information element, and is still applicable to a positioning enhancement message information element in another format in this application:

```
--ASN1STOP-ASN1START
--TAG-PositioningEnhancement-START
PositioningEnhancement::=  SEQUENCE{
Sub_frame_type {0,1,2, ..., M−1}
Switch_gap_value {0,1,2, ..., N−1}
}
--TAG-PositioningEnhancement-STOP
--ASN1STOP
```

Specifically, Sub-frame_type in the positioning enhancement information element indicates the first frame structure. For example, Sub-frame_type{1} indicates a frame structure corresponding to a sequence number in Table 1. Switch_gap_value in the positioning enhancement information element indicates a length of a switching time period in the first frame structure. For example, Switch_gap_value{1} indicates that the length of the switching time period in the first frame structure is one time-domain symbol or one slot. A unit of the length of the switching time period may be a time-domain symbol, a slot, or another length. This is not specifically limited in this application.

In this embodiment, the first message includes any one of the following: a SIB message, an RRC message, a MAC CE, an XnAP message, or DCI.

It should be noted that the first communication apparatus sends the first message to the third communication apparatus, where the first message includes the positioning enhancement message information element. The first information is located in the positioning enhancement message information element. For related descriptions of the positioning enhancement message information element and the first message, refer to the foregoing related descriptions.

Optionally, the first communication apparatus sends the first message to the third communication apparatus, where the first message includes a positioning reference signal information element. The first information is located in the positioning reference signal information element (PRS information element).

That is, the first communication apparatus may send the first information to the third communication apparatus by using an existing information element in the NR system, or send the first information to the third communication apparatus by using a newly defined information element.

In a possible implementation, the first information includes a bitmap. The bitmap is located in the positioning reference signal information element, and the bitmap indicates the first frame structure.

For example, the bitmap is "0000010000", where "0" represents a communication subframe, and "1" represents a positioning subframe. A first switching time period exists by default between the communication subframe corresponding to the bit "0" and the communication subframe corresponding to the bit "1". A second switching time period exists by default between the positioning subframe corresponding to the bit "1" and the communication subframe corresponding to the bit "0".

The first switching time period and the second switching time period may be pre-agreed to be located in the communication subframe or the positioning subframe. Lengths of the first switching time period and the second switching time period may be agreed in advance, or may be preconfigured, or may be default values.

In this embodiment of this application, in step 401 of the embodiment shown in FIG. 4, optionally, the first information indicates a frame structure used by the second communication apparatus in a first cell. Alternatively, the first information indicates a frame structure used by the second communication apparatus on each of a plurality of beams corresponding to a first cell.

The first cell is a cell in which the first communication apparatus is located, and the first cell is a cell managed by the second communication apparatus. That is, an area range included in the first cell belongs to beam coverage of the second communication apparatus.

In this implementation, the second communication apparatus may configure a frame structure for the first communication apparatus in a cell-level manner, or may configure a frame structure for the first communication apparatus in a beam-level manner.

For example, as shown in FIG. 1, the terminal device is located in beam coverage of a first cell of the satellite 1. The satellite 1 may indicate, to the terminal device and the satellite 2, a frame structure used by the satellite 1 in the first cell. Alternatively, the satellite 1 may configure a corresponding frame structure for each beam in the first cell. Then, the satellite 1 separately indicates, to the terminal device and the satellite 2, a frame structure used by the satellite 1 on each beam of the first cell.

In this implementation, a plurality of possible frame structure configuration granularities are provided. The second communication apparatus configures a frame structure for the first communication apparatus in a cell-level manner. In this way, a configuration process of the frame structure is simple and convenient. The second communication apparatus configures the frame structure for the first communication apparatus in a beam-level manner. In this way, a more appropriate frame structure may be configured for each beam with reference to a service feature of each beam. For example, when a communication service volume of the beam is large, a length of a communication time period used for communication in the frame structure should be greater than a length of a positioning time period used for positioning.

An NTN service has a non-uniformity characteristic, to fully adapt to a communication service volume of each beam. Therefore, the second communication apparatus may preferably configure a corresponding frame structure for each beam in the first cell, that is, a frame structure used by the second communication apparatus on each beam in the first cell. In this way, communication service performance is ensured while network positioning performance is improved.

Optionally, the embodiment shown in FIG. 2 further includes step 201*a*. Step 201*a* is performed before step 201.

201*a*: The second communication apparatus determines, based on a communication service volume of each of a plurality of beams corresponding to a first cell, a frame structure used by the second communication apparatus on each beam.

The second communication apparatus obtains the communication service volume of each beam. Then, the second communication apparatus configures a corresponding frame structure for each beam based on the communication service volume of each beam. In this implementation, the first frame structure in step 201 is a frame structure corresponding to a beam in which the terminal device is located. For example, as shown in FIG. 1, the terminal device is within coverage of a beam 1 of the satellite 1, and the first frame structure is a frame structure of the beam 1.

For example, if a communication service volume of the beam 1 in the first cell is 100, it can be learned that the communication service volume of the beam 1 is small, and the beam 1 may be more used to assist positioning. The second communication apparatus may use the following frame structure on the beam 1: $CCS_1PPPPPPS_2CC$. If a communication service volume of a beam 4 in the first cell is 1000, it can be learned that the communication service volume of the beam 4 is large. The communication service volume of the beam 1 differs greatly from the communication service volume of the beam 4. The beam 4 may be less used to assist positioning. The second communication apparatus may use the following frame structure on the beam 4: $CCCCS_1PS_2CCCCC$. For related descriptions of "C", "P", "$S_1$,", and "$S_2$,", refer to the related descriptions in Table 1, and details are not described herein again.

For example, as shown in FIG. 1, the first cell includes a beam 1, a beam 2, a beam 3, and a beam 4. The following shows, by using Table 4, a possible frame structure configured by the second communication apparatus for each beam included in the first cell.

TABLE 4

| Beam number | Communication service volume | Frame structure | Positioning periodicity |
|---|---|---|---|
| Beam 1 | 100 | $CCS_1PPPPPPS_2CC$ | 160 ms |
| Beam 2 | 300 | $CCCS_1PPS_2CCCCC$ | 320 ms |
| Beam 3 | 500 | $CCCS_1PPS_2CCCCC$ | 640 ms |
| Beam 4 | 1000 | $CCCCS_1PS_2CCCCC$ | 1280 ms |

The communication service volume in Table 4 may be a communication service volume of a beam in a unit time. For example, the unit time may be hour, day, or the like It can be learned from Table 4 that the second communication apparatus configures a corresponding frame structure for each beam based on a communication service volume of each beam. In the implementation, a non-uniformity characteristic of a communication service carried on a beam in an NTN network is fully considered, and a more adaptive frame structure is configured for each beam. In addition to improving positioning performance, reliability of a communication service is ensured.

It should be noted that the positioning periodicity shown in Table 4 may be understood as a configuration periodicity in which the second communication apparatus configures the positioning time period in the first frame structure for the first communication apparatus. The positioning periodicity may also be understood as a configuration periodicity of the first frame structure. A value of the positioning periodicity may be specifically determined with reference to a communication service volume on a beam. If the communication service volume on the beam is small, the beam may be more used for positioning, and the positioning periodicity may be short. If the communication service volume on the beam is large, the beam may be used less for positioning, and the positioning periodicity may be long. For example, as shown in Table 4, the communication service volume of the beam 1 is 100, and the positioning periodicity may be 160 ms. The communication service volume of the beam 4 is 1000, and the positioning periodicity may be 1280 ms.

In this embodiment, there are a plurality of manners in which the second communication apparatus obtains the communication service volume of each beam. The following shows two possible implementations.

Implementation 1: The second communication apparatus separately counts a volume of data packets successfully sent on each beam in a first time period, and then calculates an average communication service volume on each beam in a unit time based on the volume of data successfully sent on each beam and the first time period.

For example, if the first time period is T, and a volume of data packets on the beam 1 is P, an average communication service volume on the beam 1 is P/T.

A unit of the first time period may be day, hour, minute, or second. A unit of the unit time is the same as the unit of the first time period.

For example, the first time period is three days, and the volume of data packets on the beam 1 is 10000. In this case, an average communication volume of a day on the beam 1 is 3000.

Implementation 2: The second communication apparatus obtains population density of each of the plurality of beams in the first cell from a population density information database, and then estimates the communication service volume of each beam based on the population density of each beam and a corresponding coefficient.

In this embodiment, the second communication apparatus may further update the frame structure used by the second communication apparatus on each beam in time. Optionally, the embodiment shown in FIG. 2 further includes step 205 and step 206. Step 205 and step 206 may be performed after step 204.

205: The second communication apparatus updates, based on frame structure update periodicities respectively corresponding to the plurality of beams in the first cell, a frame structure used by the second communication apparatus on each of the plurality of beams in the first cell.

Specifically, the first communication apparatus may determine a frame structure update periodicity of each beam based on a change status of a communication service volume of each beam over time. The second communication apparatus may update, based on a real-time communication service volume on each beam, a frame structure used by the second communication apparatus on the beam. For example, if the communication service volume on the beam 1 changes greatly, a frame structure update periodicity of the beam 1 may be short. A real-time communication service volume on the beam 1 is large. Therefore, a length of a time period used for communication in the updated frame structure used by the second communication apparatus on the beam 1 should be greater than a time period used for positioning.

206: The second communication apparatus sends the updated frame structure used by the second communication apparatus on each beam.

Specifically, the second communication apparatus may send, to the first communication apparatus and the third communication apparatus, the updated frame structure used by the second communication apparatus on each beam.

For example, as shown in Table 5, the first cell includes a beam T1 and a beam 2. A difference between a time T1 and a time T2 in Table 5 is the frame structure update periodicity of the beam 1. If the communication service volume on the beam 1 changes greatly, the frame structure update periodicity of the beam 1 may be large. As shown in Table 5, if the communication service volume on the beam 1 is small at the time T1, the second communication apparatus may use a frame structure $CCS_1PPPPPPS_2CC$ on the beam 1. The second communication apparatus indicates to, the first communication apparatus and the second communication apparatus, that the frame structure used by the second communication apparatus on the beam 1 is $CCS_1PPPPPPS_2CC$. If the communication service volume on the beam 1 is large at the time T2, the second communication apparatus may use a frame structure $CCCS_1PPS_2CCCCC$ on the beam 1. The second communication apparatus indicates, to the first communication apparatus and the second communication apparatus, that the frame structure used by the second communication apparatus on the beam 1 is $CCCS_1PPS_2CCCCC$.

For the beam 2, a difference between a time T3 and a time T4 in Table 5 is a frame structure update periodicity of the beam 2. If the communication service volume on the beam 2 changes slightly, the frame structure update periodicity of the beam 2 may be small. As shown in Table 5, if the communication service volume on the beam 2 is large at the time T2, the second communication apparatus may use a frame structure $CCCS_1PPS_2CCCCC$ on the beam 2.

The second communication apparatus indicates to, the first communication apparatus and the third communication apparatus, that the frame structure used by the second communication apparatus on the beam 2 is $CCCS_1PPS_2CCCCC$. The communication service volume on the beam 2 at the time 3 is greater than the communication service volume on the beam 2 at the time 4. Therefore, at the time T4, the second communication apparatus may use a frame structure $CCCCS_1PS_2CCCCC$ on the beam 2. The second communication apparatus indicates to, the first communication apparatus and the third communication apparatus, that the frame structure used by the second communication apparatus on the beam 2 is $CCCCS_1PS_2CCCCC$.

TABLE 5

| Beam number | Frame structure |
|---|---|
| Beam 1 | Time T1: $CCS_1PPPPPPS_2CC$ |
| | Time T2: $CCCS_1PPS_2CCCCC$ |
| | . . . |
| Beam 2 | Time T3: $CCCS_1PPS_2CCCCC$ |
| | Time T4: $CCCCS_1PS_2CCCCC$ |
| | . . . |

The second communication apparatus periodically updates, based on a characteristic of a service carried in each beam, a frame structure used by the second communication apparatus on each beam. In this way, a more appropriate frame structure may be configured for each beam with reference to a service feature of each beam. For example, when a communication service volume of the beam is large, a length of a communication time period used for communication in the frame structure should be greater than a length of a positioning time period used for positioning. In this way, reliability of a communication service and a positioning service on each beam is ensured, positioning performance of the terminal device is improved, communication interruption time is reduced, and system performance is improved.

Figure 6:
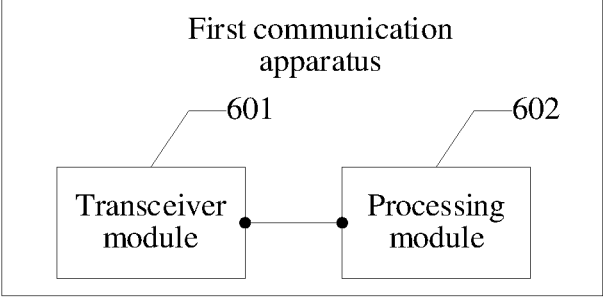
FIG. 6 is a schematic diagram of a structure of a first communication apparatus according to an embodiment of this application.

The following describes a first communication apparatus provided in an embodiment of this application. FIG. 6 is a schematic diagram of a structure of a first communication apparatus according to an embodiment of this application. The first communication apparatus may be configured to perform the steps performed by the first communication apparatus in embodiments shown in FIG. 2 and FIG. 4. For details, refer to the related descriptions in the foregoing method embodiments.

The first communication apparatus includes a transceiver module 601 and a processing module 602.

The transceiver module 601 is configured to obtain data.

The processing module 602 is configured to determine a first frame structure; and process the data based on the first frame structure. The first frame structure includes at least one communication time period and at least one positioning time period, the communication time period occupies one or more time-domain symbols in the first frame structure, and the positioning time period occupies one or more time-domain symbols in the first frame structure.

The communication time period is used to transmit the data, and the positioning time period is used to transmit a positioning reference signal of the first communication apparatus.

A first switching time period is included between the communication time period and the positioning time period, a $1^{st}$ time-domain symbol occupied by the first switching time period is consecutive to a last time-domain symbol occupied by the communication time period, and a last time-domain symbol occupied by the first switching time is consecutive to a $1^{st}$ time-domain symbol occupied by the positioning time period; or a second switching time period is included between the positioning time period and the communication time period, a $1^{st}$ time-domain symbol occupied by the second switching time period is consecutive to a last time-domain symbol occupied by the positioning time period, and a last time-domain symbol occupied by the second switching time period is consecutive to a $1^{st}$ time-domain symbol occupied by the communication time period.

In a possible implementation, the communication time period is a communication subframe, and the positioning time period is a positioning subframe. The first switching time period is located in the communication subframe or the positioning subframe, and the second switching time period is located in the communication subframe or the positioning subframe.

In another possible implementation, the communication time period is a communication slot, and the positioning time period is a positioning slot. The first switching time period is located in the communication slot or the positioning slot, and the second switching time period is located in the communication slot or the positioning slot.

In another possible implementation, if a subcarrier spacing used in the first frame structure is 15 kilohertz kHz, the first switching time period occupies one time-domain symbol in the first frame structure, and the second switching time period respectively occupies one time-domain symbol in the first frame structure; and if a subcarrier spacing used in the first frame structure is 30 kilohertz kHz, the first switching time period occupies two time-domain symbols in the first frame structure, and the second switching time period occupies two time-domain symbols in the first frame structure.

Alternatively, if a subcarrier spacing used in the first frame structure is 15 kilohertz kHz, the first switching time period occupies two time-domain symbols in the first frame structure, and the second switching time period occupies two time-domain symbols in the first frame structure; and if a subcarrier spacing used in the first frame structure is 30 kilohertz kHz, the first switching time period occupies four time-domain symbols in the first frame structure, and the second switching time period occupies four time-domain symbols in the first frame structure.

In another possible implementation, the processing module 602 is specifically configured to:

obtain first information, where the first information indicates the first frame structure; and determine the first frame structure based on the first information.

In another possible implementation, the first frame structure includes M flexible time periods, where an $m^{th}$ flexible time period in the M flexible time periods is the communication time period or the positioning time period, m is an integer greater than or equal to 1 and less than or equal to M, and M is a positive integer.

In another possible implementation, the transceiver module 601 is further configured to:

receive second information, where the second information indicates the M flexible time periods.

In another possible implementation, the processing module 602 is specifically configured to:

receive a first message, where the first message includes first information.

In another possible implementation, the first message further includes third information, and the third information indicates a length of a switching time period in the first frame structure.

In another possible implementation, the first information further indicates a length of a switching time period in the first frame structure.

In another possible implementation, the first message includes any one of the following: a SIB message, an RRC message, a MAC CE, an XnAP message, or DCI.

In another possible implementation, the first information indicates a frame structure used by a second communication apparatus in a first cell; or the first information indicates a frame structure used by a second communication apparatus on each of a plurality of beams corresponding to a first cell. The first cell is a cell in which the first communication apparatus is located, and the first cell is a cell managed by the second communication apparatus.

In another possible implementation, the processing module 602 is further configured to: update, based on update periodicities corresponding to the plurality of beams in the first cell, the frame structure used by the second communication apparatus on each of the plurality of beams.

The transceiver module 601 is further configured to:

send the updated frame structure used by the second communication apparatus on each beam.

In this embodiment of this application, the transceiver module 601 is configured to obtain data. The processing module 602 is configured to determine a first frame structure; and process the data based on the first frame structure. The first frame structure includes at least one communication time period and at least one positioning time period, the communication time period occupies one or more time-domain symbols in the first frame structure, and the positioning time period occupies one or more time-domain symbols in the first frame structure. The communication time period is used to transmit the data, and the positioning time period is used to transmit a positioning reference signal of the first communication apparatus. A first switching time period is included between the communication time period and the positioning time period, a $1^{st}$ time-domain symbol occupied by the first switching time period is consecutive to a last time-domain symbol occupied by the communication time period, and a last time-domain symbol occupied by the first switching time is consecutive to a $1^{st}$ time-domain symbol occupied by the positioning time period; or a second switching time period is included between the positioning time period and the communication time period, a $1^{st}$ time-domain symbol occupied by the second switching time period is consecutive to a last time-domain symbol occupied by the positioning time period, and a last time-domain symbol occupied by the second switching time period is consecutive to a $1^{st}$ time-domain symbol occupied by the communication time period. It can be learned that the first communication apparatus may perform communication and positioning based on the first frame structure, so as to meet a requirement of a positioning service.

Figures 7, 8:
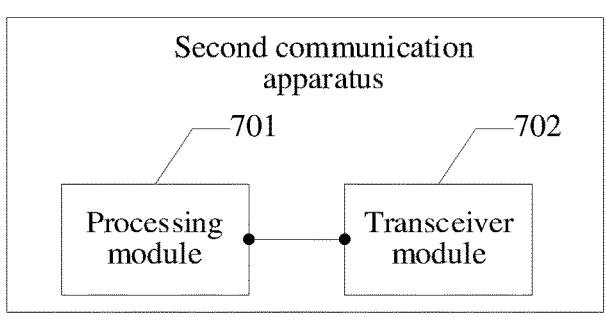
FIG. 7 is a schematic diagram of a structure of a second communication apparatus according to an embodiment of this application.
FIG. 8 is a schematic diagram of a structure of a terminal device according to an embodiment of this application.

The following describes a second communication apparatus provided in an embodiment of this application. FIG. 7 is a schematic diagram of a structure of a second communication apparatus according to an embodiment of this application. The second communication apparatus may be configured to perform the steps performed by the second communication apparatus in the embodiment shown in FIG. 2. For details, refer to the related descriptions in the foregoing method embodiments.

The second communication apparatus includes a processing module 701 and a transceiver module 702.

The processing module 701 is configured to determine a first frame structure, where the first frame structure includes at least one communication time period and at least one positioning time period, the communication time period occupies one or more time-domain symbols in the first frame structure, and the positioning time period occupies one or more time-domain symbols in the first frame structure.

The transceiver module 702 is configured to transmit data in the communication time period, and transmit a positioning reference signal of a first communication apparatus in the positioning time period.

A first switching time period is included between the communication time period and the positioning time period, a $1^{st}$ time-domain symbol occupied by the first switching time period is consecutive to a last time-domain symbol occupied by the communication time period, and a last time-domain symbol occupied by the first switching time is consecutive to a $1^{st}$ time-domain symbol occupied by the positioning time period; or a second switching time period is included between the positioning time period and the communication time period, a $1^{st}$ time-domain symbol occupied by the second switching time period is consecutive to a last time-domain symbol occupied by the positioning time period, and a last time-domain symbol occupied by the second switching time period is consecutive to a $1^{st}$ time-domain symbol occupied by the communication time period.

In a possible implementation, the communication time period is a communication subframe, and the positioning time period is a positioning subframe. The first switching time period is located in the communication subframe or the positioning subframe, and the second switching time period is located in the communication subframe or the positioning subframe.

In another possible implementation, the communication time period is a communication slot, and the positioning time period is a positioning slot. The first switching time period is located in the communication slot or the positioning slot, and the second switching time period is located in the communication slot or the positioning slot.

In another possible implementation, if a subcarrier spacing used in the first frame structure is 15 kilohertz kHz, the first switching time period occupies one time-domain symbol in the first frame structure, and the second switching time period occupies one time-domain symbol in the first frame structure; and if a subcarrier spacing used in the first frame structure is 30 kilohertz kHz, the first switching time period occupies two time-domain symbols in the first frame structure, and the second switching time period occupies two time-domain symbols in the first frame structure.

Alternatively, if a subcarrier spacing used in the first frame structure is 15 kilohertz kHz, the first switching time period occupies two time-domain symbols in the first frame structure, and the second switching time period occupies two time-domain symbols in the first frame structure; and if a subcarrier spacing used in the first frame structure is 30 kilohertz kHz, the first switching time period occupies four time-domain symbols in the first frame structure, and the second switching time period occupies four time-domain symbols in the first frame structure.

In another possible implementation, the transceiver module 702 is further configured to: send first information, where the first information indicates the first frame structure.

In another possible implementation, the first frame structure includes M flexible time periods, where an $m^{th}$ flexible time period in the M flexible time periods is the communication time period or the positioning time period, m is an integer greater than or equal to 1 and less than or equal to M, and M is a positive integer.

In another possible implementation, the transceiver module 702 is further configured to: send second information, where the second information indicates the M flexible time periods.

In another possible implementation, the transceiver module 702 is specifically configured to: send a first message, where the first message includes the first information.

In another possible implementation, the first message further includes third information, and the third information indicates a length of a switching time period in the first frame structure.

In another possible implementation, the first information further indicates a length of a switching time period in the first frame structure.

In another possible implementation, the first message includes any one of the following: a SIB message, an RRC message, a MAC CE, an XnAP message, or DCI.

In another possible implementation, the first information indicates a frame structure used by the second communication apparatus in a first cell; or the first information indicates a frame structure used by the second communication apparatus on each of a plurality of beams corresponding to a first cell. The first cell is a cell in which the first communication apparatus is located, and the first cell is a cell managed by the second communication apparatus.

In another possible implementation, the processing module 701 is further configured to: determine, based on a communication service volume, a frame structure used by the second communication apparatus on each beam, where the communication service volume includes communication service volumes respectively corresponding to the plurality of beams.

In another possible implementation, the processing module 701 is further configured to: update, based on update periodicities respectively corresponding to the plurality of beams in the first cell, the frame structure used by the second communication apparatus on each of the plurality of beams in the first cell.

The transceiver module 702 is further configured to: send the updated frame structure used by the second communication apparatus on each beam.

In this embodiment of this application, the processing module 701 is configured to determine a first frame structure, where the first frame structure includes at least one communication time period and at least one positioning time period, the communication time period occupies one or more time-domain symbols in the first frame structure, and the positioning time period occupies one or more time-domain symbols in the first frame structure. The transceiver module 702 is configured to transmit data in the communication time period, and transmit a positioning reference signal of a first communication apparatus in the positioning time period. A first switching time period is included between the communication time period and the positioning time period, a $1^{st}$ time-domain symbol occupied by the first switching time period is consecutive to a last time-domain symbol occupied by the communication time period, and a last time-domain symbol occupied by the first switching time is consecutive to a $1^{st}$ time-domain symbol occupied by the positioning time period; or a second switching time period is included between the positioning time period and the communication time period, a $1^{st}$ time-domain symbol occupied by the second switching time period is consecutive to a last time-domain symbol occupied by the positioning time period, and a last time-domain symbol occupied by the second switching time period is consecutive to a $1^{st}$ time-domain symbol occupied by the communication time period. It can be learned that the second communication apparatus may perform communication and positioning with the first communication apparatus based on the first frame structure, so as to meet a requirement of a positioning service.

The following shows a possible schematic diagram of a structure in which a first communication apparatus is a terminal device in FIG. 8.

FIG. 8 is a simplified schematic diagram of a structure of a terminal device. For ease of understanding and figure illustration, an example in which the terminal device is a mobile phone is used in FIG. 8. As shown in FIG. 8, the terminal device includes a processor, a memory, a radio frequency circuit, an antenna, and an input/output apparatus. The processor is mainly configured to process a communication protocol and communication data, control the terminal device, execute a software program, process data of the software program, and the like. The memory is mainly configured to store a software program and data. The radio frequency circuit is mainly configured to perform conversion between a baseband signal and a radio frequency signal, and process the radio frequency signal. The antenna is mainly configured to send and receive the radio frequency signal in a form of an electromagnetic wave. The input/output apparatus, such as a touchscreen, a display screen, or a keyboard, is mainly configured to receive data input by a user and output data to the user. It should be noted that terminal devices of some types may not have the input/output apparatus.

When needing to send data, after performing baseband processing on to-be-sent data, the processor outputs a baseband signal to the radio frequency circuit; and the radio frequency circuit performs radio frequency processing on the baseband signal and sends the radio frequency signal to outside in a form of an electromagnetic wave through the antenna. When data needs to be sent to the terminal device, the radio frequency circuit receives the radio frequency signal through the antenna, converts the radio frequency signal into a baseband signal, and outputs the baseband signal to the processor. The processor converts the baseband signal into data, and processes the data. For ease of description, FIG. 8 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a transceiver unit of the terminal device, and the processor having a processing function is considered as a processing unit of the terminal device. As shown in FIG. 8, the terminal device includes a transceiver unit 810 and a processing unit 820. The transceiver unit may also be referred to as a transceiver, a transceiver machine, a transceiver apparatus, or the like. The processing unit may also be referred to as a processor, a processing board, a processing module, a processing apparatus, or the like. Optionally, a component configured to implement the receiving function in the transceiver unit 810 may be considered as a receiving unit, and a component configured to implement the sending function in the transceiver unit 810 may be considered as a sending unit. That is, the transceiver unit 810 includes the receiving unit and the sending unit. The transceiver unit may also be referred to as a transceiver machine, a transceiver, a transceiver circuit, and the like sometimes. The receiving unit sometimes may also be referred to as a receiver machine, a receiver, a receive circuit, or the like. The sending unit sometimes may also be referred to as a transmitter machine, a transmitter, a transmit circuit, or the like.

It should be understood that the transceiver unit 810 is configured to perform a sending operation and a receiving operation of the first communication apparatus in the foregoing method embodiments, and the processing unit 820 is configured to perform an operation other than the receiving/sending operation of the first communication apparatus in the foregoing method embodiments.

For example, in a possible implementation, the processing unit 802 is configured to perform step 203 and step 204 in FIG. 2. The transceiver unit 810 is configured to perform step 202a in FIG. 2.

When the terminal device is a chip, the chip includes a transceiver unit and a processing unit. The transceiver unit may be an input/output circuit or a communication interface. The processing unit is a processor, a microprocessor, or an integrated circuit integrated on the chip.

Figure 9:
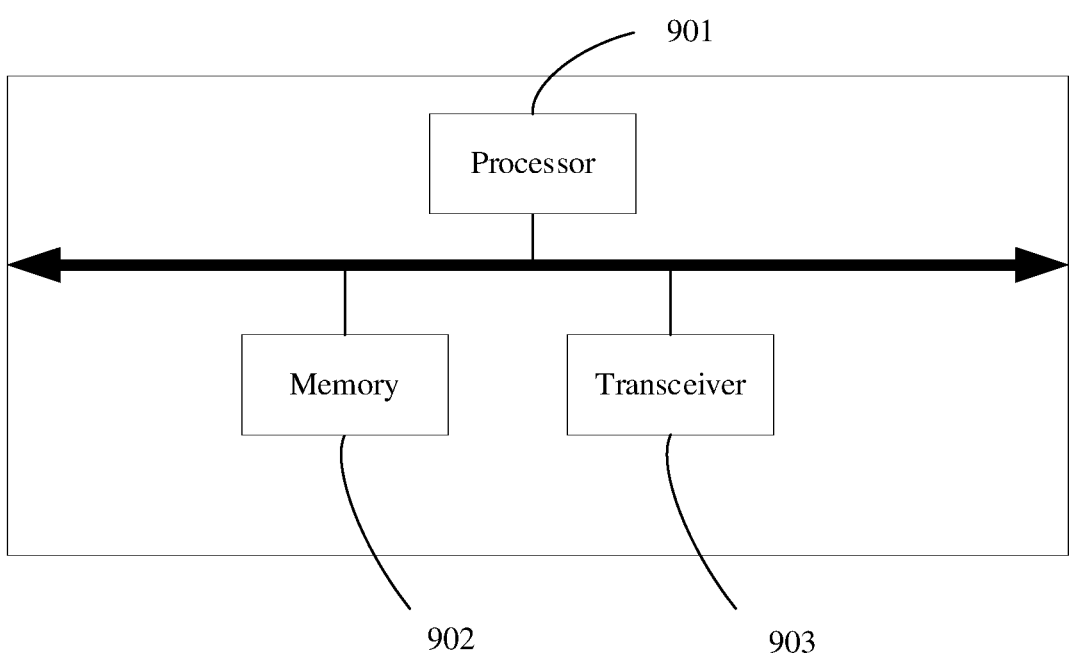
FIG. 9 is a schematic diagram of another structure of a second communication apparatus according to an embodiment of this application.

This application further provides a second communication apparatus. FIG. 9 is a schematic diagram of another structure of a second communication apparatus according to an embodiment of this application. The second communication apparatus may be configured to perform the steps performed by the second communication apparatus in the embodiment shown in FIG. 2. For details, refer to the related descriptions in the foregoing method embodiments.

The second communication apparatus includes a processor 901 and a memory 902. Optionally, the second communication apparatus further includes a transceiver 903.

In a possible implementation, the processor 901, the memory 902, and the transceiver 903 are separately connected through a bus, and the memory stores computer instructions.

The processing module 701 in the foregoing embodiments may be specifically the processor 901 in this embodiment. Therefore, specific implementation of the processor 901 is not described again. The transceiver module 702 in the foregoing embodiments may be specifically the transceiver 903 in this embodiment. Therefore, specific implementation of the transceiver 903 is not described again.

Figure 10:
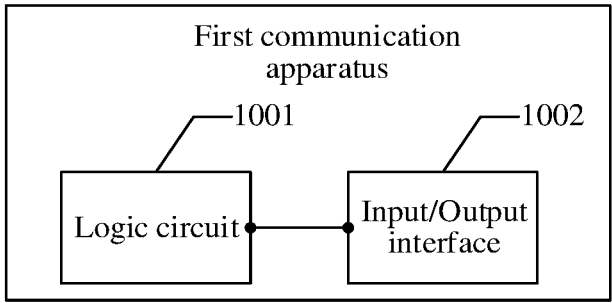
FIG. 10 is a schematic diagram of another structure of a first communication apparatus according to an embodiment of this application.

FIG. 10 is a schematic diagram of another structure of a first communication apparatus according to an embodiment of this application. Referring to FIG. 10, the first communication apparatus includes a logic circuit 1001 and an input/output interface 1002. The first communication apparatus may be configured to perform embodiments shown in FIG. 2 and FIG. 4.

Optionally, the input/output interface 1002 may have a function of the transceiver module 601 in the embodiment shown in FIG. 6. The logic circuit 1002 may have a function of the processing module 602 in the embodiment shown in FIG. 6.

Optionally, the logic circuit 1001 may have a function of the processor 820 in the embodiment shown in FIG. 8, and the logic circuit 1001 may be configured to perform the steps in the foregoing communication method.

The first communication apparatus shown in FIG. 10 may perform the technical solutions shown in the foregoing method embodiments. An implementation principle and a beneficial effect of the first communication apparatus are similar to those of the foregoing method embodiments, and details are not described herein again.

Figure 11:
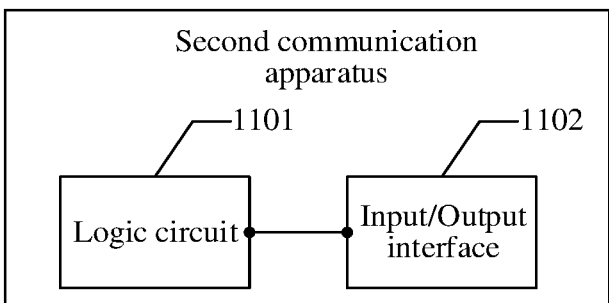
FIG. 11 is a schematic diagram of another structure of a second communication apparatus according to an embodiment of this application.

FIG. 11 is a schematic diagram of another structure of a second communication apparatus according to an embodiment of this application. Referring to FIG. 11, the second communication apparatus includes a logic circuit 1101 and an input/output interface 1102. The second communication apparatus may be configured to perform the embodiment shown in FIG. 2.

Optionally, the input/output interface 1102 may have a function of the transceiver module 702 in the embodiment shown in FIG. 7. The logic circuit 1102 may have a function of the processing module 701 in the embodiment shown in FIG. 7.

Optionally, the logic circuit 1101 may have a function of the processor 901 in the embodiment shown in FIG. 9, and the logic circuit 1101 may be configured to perform the steps in the foregoing communication method.

The second communication apparatus shown in FIG. 11 may perform the technical solutions shown in the foregoing method embodiments. An implementation principle and a beneficial effect of the second communication apparatus are similar to those of the foregoing method embodiments, and details are not described herein again.

Figure 12:
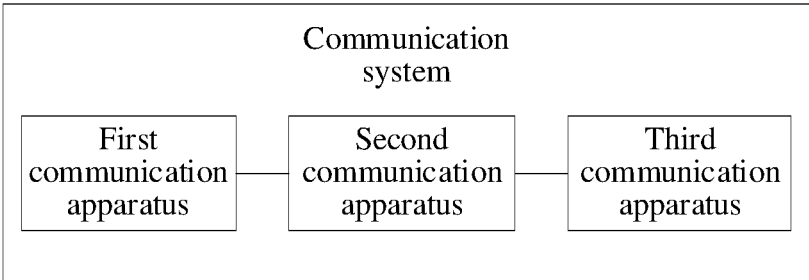
FIG. 12 is a schematic diagram of a communication system according to an embodiment of this application.

Referring to FIG. 12, an embodiment of this application further provides a communication system. The communication system includes the first communication apparatus shown in FIG. 6, the second communication apparatus shown in FIG. 7, and a third communication apparatus. The first communication apparatus shown in FIG. 6 is configured to perform all or some steps performed by the first communication apparatus in embodiments shown in FIG. 2 and FIG. 4, and the second communication apparatus shown in FIG. 7 is configured to perform all or some steps performed by the second communication apparatus in the embodiment shown in FIG. 2. The third communication apparatus is configured to assist the second communication apparatus in positioning the first communication apparatus. For specific related operations performed by the third communication apparatus, refer to the related descriptions in the foregoing method embodiments.

An embodiment of this application further provides a computer program product including instructions. When the computer program product runs on a computer, the computer is enabled to perform the communication methods in embodiments shown in FIG. 2 and FIG. 4.

An embodiment of this application further provides a computer-readable storage medium, including computer instructions. When the computer instructions run on a computer, the computer is enabled to perform the communication methods in embodiments shown in FIG. 2 and FIG. 4.

An embodiment of this application further provides a chip apparatus, including a processor, configured to connect to a memory and invoke a program stored in the memory, so that the processor performs the communication methods in embodiments shown in FIG. 2 and FIG. 4.

The processor mentioned in any of the foregoing may be a general central processing unit, a microprocessor, an application-specific integrated circuit (ASIC), or one or more of integrated circuits configured to control program execution of the communication method in embodiments shown in FIG. 2 and FIG. 4. The memory mentioned in any one of the foregoing may be a read-only memory (ROM), another type of static storage device that can store static information and instructions, a random access memory (RAM), or the like.

It may be clearly understood by a person skilled in the art that, for convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

The units described as separate parts may or may not be physically separate, and parts displayed as units may or may not be physical units, and may be located at one location, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of the software function unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) to perform all or some of the steps of the methods in embodiments of this application. The foregoing storage medium includes: any medium that can store program code, a USB flash drive, a removable hard disk, a read-only memory (ROM), a random access memory (RAM), a magnetic disk, an optical disc, and the like.

The foregoing embodiments are merely intended for describing the technical solutions of this application, but not for limiting this application. Although this application is described in detail with reference to the foregoing embodiments, a person of ordinary skill in the art should understand that, modifications may still be made to the technical solutions described in the foregoing embodiments, or equivalent replacements may be made to the part of the technical features; and these modifications or replacements will not cause the essence of corresponding technical solutions to depart from the scope of the technical solutions in embodiments of this application.

What is claimed is:

1. A communication method performed by a first communication apparatus, comprising:

receiving data to be processed in a communication time period in a first frame structure from a second communication apparatus;

receiving a positioning reference signal of the first communication apparatus in a positioning time period in the first frame structure from the second communication apparatus;

determining the first frame structure; and processing the data based on the first frame structure, wherein the first frame structure comprises the communication time period and the positioning time period, the communication time period occupies one or more time-domain symbols in the first frame structure, and the positioning time period occupies one or more time-domain symbols in the first frame structure, wherein the communication time period is for transmitting the data from the second communication apparatus to the first communication apparatus, and the positioning time period is for transmitting the positioning reference signal of the first communication apparatus from the second communication apparatus to the first communication apparatus, and wherein a first switching time period is comprised between the communication time period and the positioning time period, a 1st time-domain symbol occupied by the first switching time period is consecutive to a last time-domain symbol occupied by the communication time period, and a last time-domain symbol occupied by the first switching time is consecutive to a 1st time-domain symbol occupied by the positioning time period, or a second switching time period is comprised between the positioning time period and the communication time period, a 1st time-domain symbol occupied by the second switching time period is consecutive to a last time-domain symbol occupied by the positioning time period, and a last time-domain symbol occupied by the second switching time period is consecutive to a 1st time-domain symbol occupied by the communication time period.

2. The method according to claim 1, wherein the communication time period is located in a communication subframe, and the positioning time period is located in a positioning subframe, and wherein the first switching time period is located in the communication subframe or the positioning subframe, or the second switching time period is located in the communication subframe or the positioning subframe.

3. The method according to claim 1, wherein the communication time period is located in a communication slot, and the positioning time period is located in a positioning slot, and wherein the first switching time period is located in the communication slot or the positioning slot, or the second switching time period is located in the communication slot or the positioning slot.

4. The method according to claim 1, wherein when a subcarrier spacing used in the first frame structure is 15 kilohertz (kHz), the first switching time period occupies one time-domain symbol in the first frame structure, and the second switching time period occupies one time-domain symbol in the first frame structure; and when a subcarrier spacing used in the first frame structure is 30 kHz, the first switching time period occupies two time-domain symbols in the first frame structure, and the second switching time period occupies two time-domain symbols in the first frame structure; or when a subcarrier spacing used in the first frame structure is 15 kHz, the first switching time period occupies two time-domain symbols in the first frame structure, and the second switching time period occupies two time-domain symbols in the first frame structure; and when a subcarrier spacing used in the first frame structure is 30 kHz, the first switching time period occupies four time-domain symbols in the first frame structure, and the second switching time period occupies four time-domain symbols in the first frame structure.

5. The method according to claim 1, wherein the step of determining the first frame structure comprises:

obtaining first information indicating the first frame structure; and determining the first frame structure based on the first information.

6. The method according to claim 1, wherein the first frame structure comprises M flexible time periods, wherein an $m^{th}$ flexible time period in the M flexible time periods is the communication time period or the positioning time period, m is an integer greater than or equal to 1 and less than or equal to M, and M is a positive integer.

7. The method according to claim 6, further comprising:

receiving second information indicating the M flexible time periods.

8. The method according to claim 5, wherein the step of obtaining the first information comprises:

receiving a first message comprising the first information.

9. The method according to claim 8, wherein the first message further comprises third information indicating a length of a switching time period in the first frame structure.

10. The method according to claim 5, wherein the first information further indicates a length of a switching time period in the first frame structure.

11. The method according to claim 8, wherein the first message is a system information block (SIB) message, a radio resource control (RRC) message, a media access control control element (MAC CE), an Xn interface application protocol (XnAP) message, or downlink control information (DCI).

12. The method according to claim 1, wherein the first information indicates a frame structure used by the second communication apparatus in a first cell; or the first information indicates a frame structure used by the second communication apparatus on each of a plurality of beams corresponding to a first cell, wherein the first cell is a cell in which the first communication apparatus is located, and the first cell is a cell managed by the second communication apparatus.

13. A communication method performed by a second communication apparatus, comprising:

determining a first frame structure comprising a communication time period and a positioning time period, wherein the communication time period occupies one or more time-domain symbols in the first frame structure, and the positioning time period occupies one or more time-domain symbols in the first frame structure; and transmitting, by the second communication apparatus to a first communication apparatus, data in the communication time period; and transmitting a positioning reference signal of the first communication apparatus in the positioning time period to the first communication apparatus, wherein a first switching time period is comprised between the communication time period and the positioning time period, a $1^{st}$ time-domain symbol occupied by the first switching time period is consecutive to a last time-domain symbol occupied by the communication time period, and a last time-domain symbol occupied by the first switching time is consecutive to a $1^{st}$ time-domain symbol occupied by the positioning time period, or a second switching time period is comprised between the positioning time period and the communication time period, a $1^{st}$ time-domain symbol occupied by the second switching time period is consecutive to a last time-domain symbol occupied by the positioning time period, and a last time-domain symbol occupied by the second switching time period is consecutive to a $1^{st}$ time-domain symbol occupied by the communication time period.

14. The method according to claim 13, wherein the communication time period is located in a communication subframe, and the positioning time period is located in a positioning subframe, and wherein the first switching time period is located in the communication subframe or the positioning subframe, or the second switching time period is located in the communication subframe or the positioning subframe.

15. The method according to claim 14, wherein the communication time period is located in a communication slot, and the positioning time period is located in a positioning slot, and wherein the first switching time period is located in the communication slot or the positioning slot, or the second switching time period is located in the communication slot or the positioning slot.

16. The method according to claim 13, wherein when a subcarrier spacing used in the first frame structure is 15 kilohertz (kHz), the first switching time period occupies one time-domain symbol in the first frame structure, and the second switching time period occupies one time-domain symbol in the first frame structure; and when a subcarrier spacing used in the first frame structure is 30 kHz, the first switching time period occupies two time-domain symbols in the first frame structure, and the second switching time period occupies two time-domain symbols in the first frame structure; or when a subcarrier spacing used in the first frame structure is 15 kHz, the first switching time period occupies two time-domain symbols in the first frame structure, and the second switching time period occupies two time-domain symbols in the first frame structure; and when a subcarrier spacing used in the first frame structure is 30 kHz, the first switching time period occupies four time-domain symbols in the first frame structure, and the second switching time period occupies four time-domain symbols in the first frame structure.

17. The method according to claim 13, further comprising:

sending first information indicating the first frame structure to the first communication device.

18. The method according to claim 13, wherein the first frame structure comprises M flexible time periods, wherein an $m^{th}$ flexible time period in the M flexible time periods is the communication time period or the positioning time period, m is an integer greater than or equal to 1 and less than or equal to M, and M is a positive integer.

19. The method according to claim 18, further comprising:

sending second information indicating the M flexible time periods to the first communication device.

20. A first communication apparatus, comprising:

a memory storing executable instructions; and one or more processors configured to execute the executable instructions to perform operations of:

receiving data to be processed in a communication time period in a first frame structure from a second communication apparatus;

receiving a positioning reference signal of the first communication apparatus in a positioning time period in the first frame structure from the second communication apparatus;

determining the first frame structure; and processing the data based on the first frame structure, wherein the first frame structure comprises the communication time period and the positioning time period, the communication time period occupies one or more time-domain symbols in the first frame structure, and the positioning time period occupies one or more time-domain symbols in the first frame structure, wherein the communication time period is for transmitting the data from the second communication apparatus to the first communication apparatus, and the positioning time period is for transmitting the positioning reference signal of the first communication apparatus from the second communication apparatus to the first communication apparatus, and wherein a first switching time period is comprised between the communication time period and the positioning time period, a $1^{st}$ time-domain symbol occupied by the first switching time period is consecutive to a last time-domain symbol occupied by the communication time period, and a last time-domain symbol occupied by the first switching time is consecutive to a $1^{st}$ time-domain symbol occupied by the positioning time period, or a second switching time period is comprised between the positioning time period and the communication time period, a $1^{st}$ time-domain symbol occupied by the second switching time period is consecutive to a last time-domain symbol occupied by the positioning time period, and a last time-domain symbol occupied by the second switching time period is consecutive to a $1^{st}$ time-domain symbol occupied by the communication time period.

* * * * *